United States Patent
Lyu et al.

(10) Patent No.: US 12,538,167 B2
(45) Date of Patent: Jan. 27, 2026

(54) METHOD AND DEVICE FOR TRANSMITTING BSR

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/031,012

(22) Filed: Jan. 17, 2025

(65) Prior Publication Data
US 2025/0168697 A1    May 22, 2025

Related U.S. Application Data

(63) Continuation of application No. PCT/CN2023/080883, filed on Mar. 10, 2023.

(30) Foreign Application Priority Data

Dec. 28, 2022  (CN) .......................... 202211700045.0

(51) Int. Cl.
  *H04W 28/02*  (2009.01)
  *H04W 72/51*  (2023.01)

(52) U.S. Cl.
  CPC ....... *H04W 28/0278* (2013.01); *H04W 72/51* (2023.01)

(58) Field of Classification Search
  CPC .......................... H04W 28/0278; H04W 72/51

USPC .......................................................... 370/230
See application file for complete search history.

(56) References Cited

U.S. PATENT DOCUMENTS

9,580,150 B2 *  2/2017  Lee .......................... B63B 79/00
2013/0163537 A1 *  6/2013  Anderson ............. H04L 1/1671
                                                                         370/329

FOREIGN PATENT DOCUMENTS

| CN | 108631918 A | 10/2018 |
| CN | 108632884 A | 10/2018 |
| CN | 111669781 A | 9/2020 |
| CN | 113950019 A | 1/2022 |
| WO | WO 2018141253 A1 | 8/2018 |

OTHER PUBLICATIONS

International Search Report and Written Opinion in International Appln. No. PCT/CN2023/080883, mailed on Jul. 17, 2023, 13 pages (with partial English translation).
Samsung Electronics R&D Institute UK, "Conditions for BSR MAC CE generation and clearing of triggered BSR(s)," 3GPP TSG-RAN WG2 NR. Ad hoc 1801, R2-1800814, Vancouver, Canada, Jan. 22-26, 2018, 4 pages.

* cited by examiner

*Primary Examiner* — Angel T Brockman
(74) *Attorney, Agent, or Firm* — Fish & Richardson P.C.

(57) ABSTRACT

Embodiments of the present disclosure provide a method and a device for transmitting a BSR, including: acquiring, by a terminal device, first information, and sending, by the terminal device, a first BSR to a network device based on the first information. The first BSR is configured to indicate data volume of data to be transmitted and a remaining transmission duration corresponding to the data to be transmitted.

20 Claims, 5 Drawing Sheets

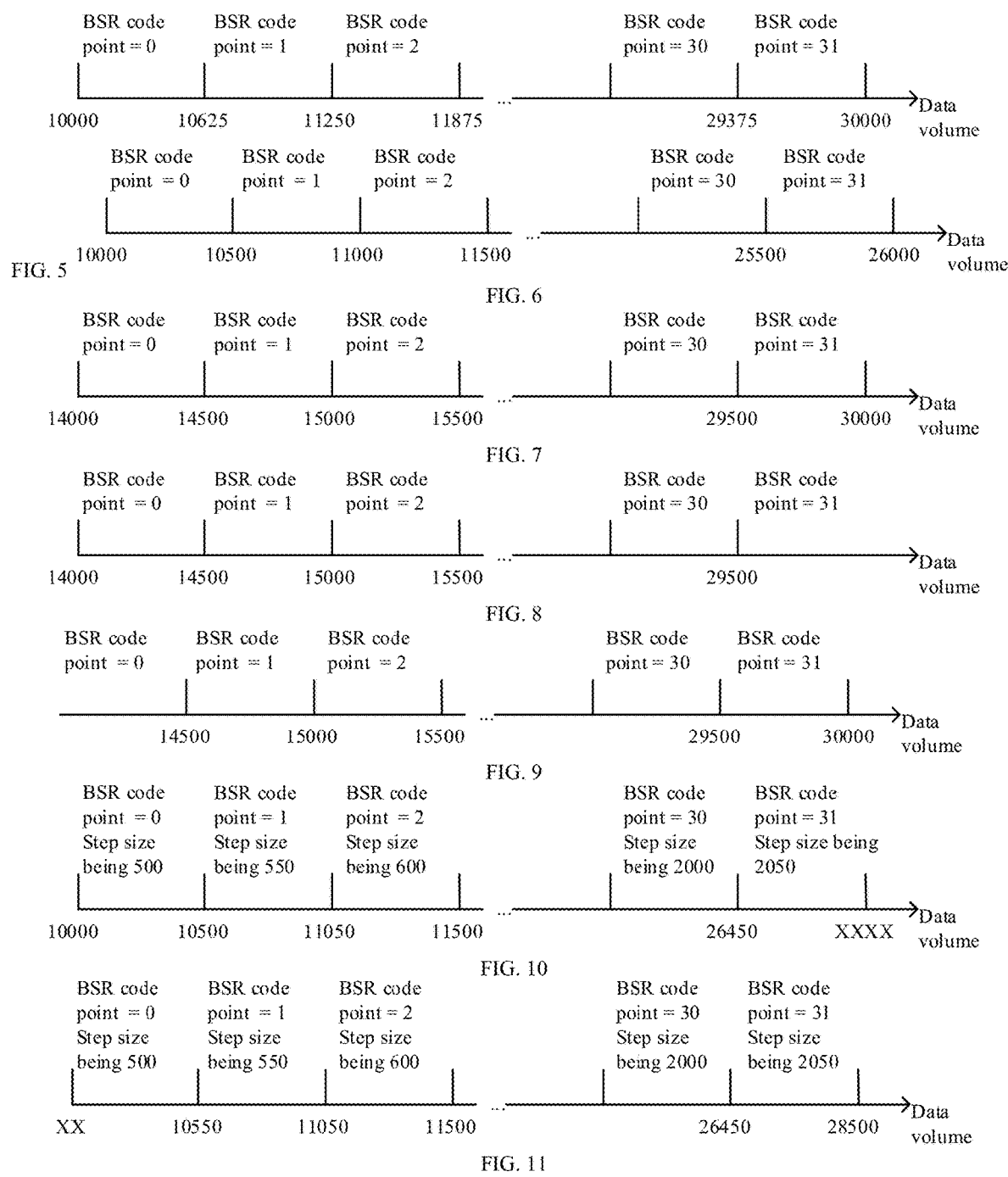

METHOD AND DEVICE FOR TRANSMITTING BSR

CROSS REFERENCE TO RELATED APPLICATIONS

This application is a continuation of International Patent Application No. PCT/CN2023/080883, filed Mar. 10, 2023, which claims the benefit of priority under the Paris Convention to Chinese Patent Application No. 2022117000450, filed on Dec. 28, 2022, the disclosures of which are incorporated herein by reference in their entirety.

TECHNICAL FIELD

Embodiments of the present disclosure relate to the field of communication, and in particular to a method and a device for transmitting a BSR.

BACKGROUND

A terminal device can send a BSR to a network device to request an uplink resource. If data volume to be transmitted in the terminal device is relatively large, a range of the data volume corresponding to the BSR is relatively large. When the network device allocates the uplink resource to the terminal device, there may be problems of resource waste or inability to meet the transmission latency requirements of the terminal device.

One solution is that the terminal device can indicate the data volume to be transmitted and the corresponding remaining transmission duration when sending the BSR. However, there are currently no clear rules regarding the specific details.

SUMMARY

Embodiments of the present disclosure provide a method and a device for transmitting a BSR. Multiple aspects related to the embodiments of the present disclosure are described below.

In a first aspect, a method for transmitting a BSR is provided, which includes: acquiring, by a terminal device, first information, and sending, by the terminal device, a first BSR to a network device based on the first information. The first BSR is configured to indicate data volume of data to be transmitted and a remaining transmission duration corresponding to the data to be transmitted.

In a second aspect, a method for transmitting a BSR is provided, which includes: receiving, by a network device, a first BSR sent by a terminal device. The first BSR is generated based on first information, and the first BSR is configured to indicate data volume of data to be transmitted and a remaining transmission duration corresponding to the data to be transmitted.

In a third aspect, a terminal device is provided, which includes an acquisition unit, configured to acquire first information, and a sending unit, configured to send a first BSR to a network device based on the first information, The first BSR is configured to indicate data volume of data to be transmitted and a remaining transmission duration corresponding to the data to be transmitted.

In a fourth aspect, a network device is provided, which includes: a receiving unit, configured to receive a first BSR sent by a terminal device. The first BSR is generated based on first information, and the first BSR is configured to indicate data volume of data to be transmitted and a remaining transmission duration corresponding to the data to be transmitted.

In a fifth aspect, a communication device is provided, which includes a memory configured to store a program and a processor configured to call the program in the memory to execute the method according to any one of the first aspect or the second aspect.

In a sixth aspect, a device is provided, which includes a processor configured to call a program from a memory to execute the method according to any one of the first aspect or the second aspect.

In a seventh aspect, a chip is provided, which includes a processor configured to call a program from a memory, to enable a device mounted with the chip to execute the method according to any one of the first aspect or the second aspect.

In an eighth aspect, a computer-readable storage medium is provided. A program is stored on the computer-readable storage medium, and the program is configured to cause a computer to execute the method according to any one of the first aspect or the second aspect.

In a ninth aspect, a computer program product is provided, which includes a program configured to cause a computer to execute the method according to any one of the first aspect or the second aspect.

In a tenth aspect, a computer program is provided, which causes a computer to execute the method according to any one of the first aspect or the second aspect.

The terminal device according to the embodiments of the present disclosure can send the first BSR to the network device based on the first information, thus clarifying the generation process of the first BSR.

BRIEF DESCRIPTION OF THE DRAWINGS

FIG. 5 to FIG. 11 are schematic diagrams for determining a first BSR table provided in some embodiments of the present disclosure.

DETAILED DESCRIPTION OF THE EMBODIMENTS

The technical scheme in the present disclosure embodiment will be described in combination with the attached drawings in the embodiments of the present disclosure.

Figure 1:
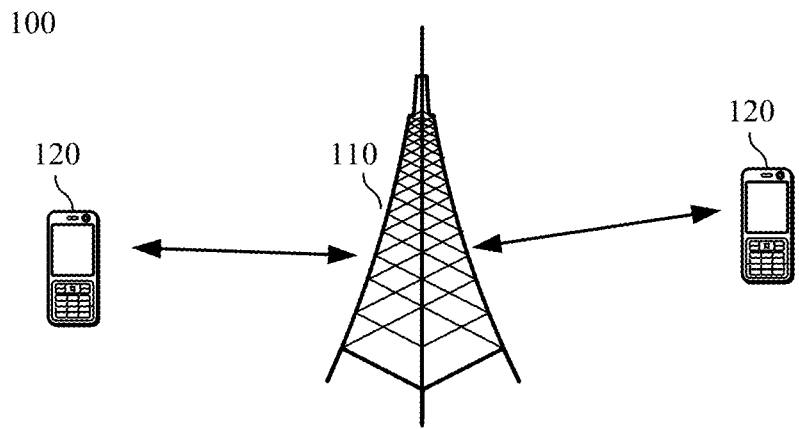
FIG. 1 is a schematic diagram of a wireless communication system to which some embodiments of the present disclosure can be applied.

FIG. 1 shows a wireless communication system 100 to which the embodiments of the present disclosure can be applied. The wireless communication system 100 includes a base station 110 and a terminal device 120. The base station 110 is a device that communicates with the terminal device 120. The base station 110 can provide communication coverage for a specific geographical area and can communicate with the terminal device 120 located in the coverage area.

FIG. 1 exemplarily shows one base station and two terminals. Optionally, the wireless communication system 100 includes multiple base stations and the coverage area of each base station may include other number of terminal devices, which is not limited in the embodiments of the present disclosure.

Optionally, the wireless communication system 100 further includes other network entities such as a network controller and a mobility management entity, which is not limited in the embodiments of the present disclosure.

It should be understood that the technical solutions according to the embodiments of the present disclosure can be applied to various communication systems, such as a 5th generation (5G) system or new radio (NR), a long-term evolution (LTE) system, a LTE frequency division duplex (FDD) system, a LTE time division duplex (TDD) system, etc. The technical solutions according to the present disclosure can also be applied to future communication systems, such as a sixth generation mobile communication system, a satellite communication system, etc.

The terminal device in the embodiments of the present disclosure can be referred to as user equipment (UE), an access terminal, a user unit, a user station, a mobile station (MS), a mobile terminal (MT), a remote station, a remote terminal, a mobile device, a user terminal, a terminal, a wireless communication device, a user agent or a user device. The terminal device in the embodiments of the present disclosure can be referred to as a device that provides voice and/or data connectivity to a user, and can be used to connect people, an object and a computer, such as a handheld device or a vehicle-mounted device with wireless connection function. The terminal device in the embodiments of the present disclosure can be referred to as a mobile phone, a tablet computer (Pad), a notebook computer, a palm computer, a mobile internet device (MID), a wearable device, a virtual reality (VR) device, an augmented reality (AR) device, a wireless terminal in industrial control, a wireless terminal in self driving, a wireless terminals in a remote medical surgery, a wireless terminals in smart grid, a wireless terminal in transportation safety, a wireless terminal in a smart city, a wireless terminal in a smart home, etc. Optionally, the UE can be used to act as a base station. For example, the UE may act as a scheduling entity that provides a lateral link signal between UEs in V2X or D2D, etc. For example, a cellular phone and a car communicate with each other using lateral link signals. Communication between the cellular phone and the smart home device is not necessary to relay communication signals through the base station.

The base station in the embodiments of the present disclosure embodiment is a device configured to communicate with a terminal device, which can also be referred to as an access network device or a wireless access network device. The base station in the embodiments of the present disclosure is refer to as a radio access network (RAN) node (or device) that connects a terminal device to a wireless network. The base station can broadly cover the following names, or replace them with the following names, such as Node B, evolved NodeB (eNB), next generation NodeB (GNB), a relay station, an access point, a transmitting and receiving point (TRP), a transmitting point (TP), a main station (MeNB), an auxiliary station (SeNB), a multi-standard wireless (MSR) node, a home base station, a network controller, an access node, a wireless node, an access point (AP), a transmitting node, a transceiver node, a base band unit (BBU), a remote radio unit (RRU), an active antenna unit (AAU), a remote radio head (RRH), a central unit (CU), a distributed unit (DU), a positioning node, etc. The base station can be a macro base station, a micro base station, a relay node, a donor node, or a combination thereof. A base station can also be a communication module, a modem or a chip mounted in the aforementioned equipment or device. The base station can also be a mobile switching center, a device that serves as a base station in device-to-device (D2D) communication, vehicle-to-everything (V2X) communication, machine-to-machine (M2M) communication, a network-side device in 6G network, and a device that serves as the base station in future communication systems. The base station can support networks with the same or different access technologies. The specific technology and equipment form adopted by the base station are not limited in the embodiments of the present disclosure.

The base station can be fixed or mobile. For example, a helicopter or a drone can be configured to be used as a mobile base station, and one or more cells can move according to the location of the mobile base station. In other examples, a helicopter or a drone can be configured to be used as a device to communicate with another base station.

In some embodiments of the present disclosure, the base station can be CU or DU, or the base station can include both CU and DU. gNB can also include AAU.

The base station and the terminal device can be deployed on land, including indoor or outdoor, handheld or vehicle mounted. The base station can also be deployed on the water. The base station can also be deployed on airplanes, balloons and satellites in the air. The scenes where the base station and the terminal device are located is not limited in the embodiments of the present disclosure.

With the continuous development of wireless cellular communication technology, especially the development of 5G technology, its spectrum efficiency is getting higher and higher, the available frequency band is getting wider and wider, and the data transmission rate is getting larger and larger. Therefore, it is gradually feasible to support big data services (such as extended reality (XR) services) by using cellular communication technology. The development of XR and 5G network promotes each other and circulates positively. Generally, an XR service of a user requires a transmission rate ranging from 30 Mbps to 200 Mbps. At least 10 terminals in a cell need to support XR service simultaneously. Only a 5G network can provide such a large transmission capacity. In addition, compared with the previous wireless network, the transmission capacity of the 5G cellular network is greatly increased, and the existing mainstream services cannot fill the network capacity, which leads to the vacancy of the network transmission capacity. Objectively, a new service is needed to fully utilize the 5G network and promote the development of the 5G network.

The main content of XR service is video service. According to the quality of service (QoS), video service data can be divided into a plurality of protocol data unit (PDU) sets. A PDU set can include a plurality of PDUs, and the PDUs in a PDU set have a same QoS requirement for the transmission network. A plurality of PDU sets of the same type have the same QoS requirement, and a plurality of PDU sets of different types have different QoS requirements. Mapping relationships among PDU sets and other channels can include the three methods shown in FIG. 2.

In FIG. 2(a), the PDU set is in one-to-one correspondence with a QoS stream, a data radio bear (DRB), a packet data convergence protocol (PDCP) and a radio link control (RLC). In FIG. 2(b), a plurality of QoS streams can correspond to a same DRB, and the DRB can correspond to a plurality of PDCPs. In FIG. 2(c), a plurality of PDU sets can correspond to a same QoS stream.

Figure 2:
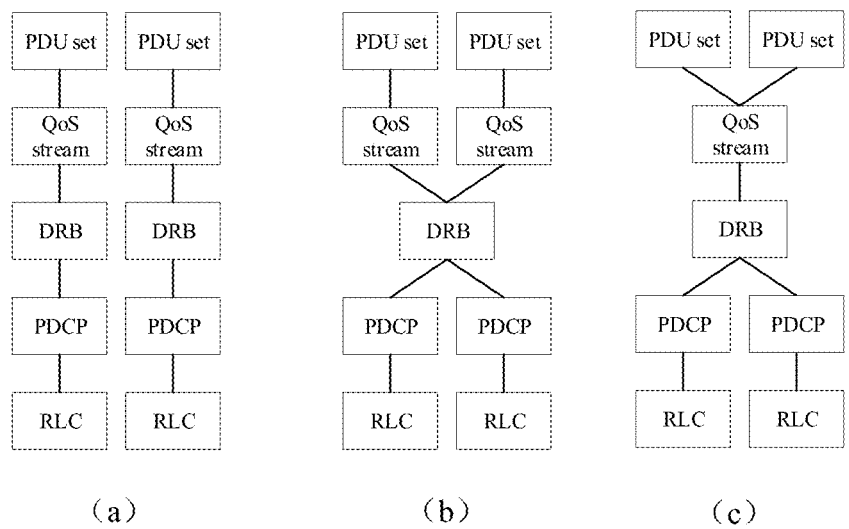
FIG. 2 is a schematic diagram of mapping relationships among different entities.

In the corresponding relationships shown in FIG. 2, both PDCP and RLC are in one-to-one correspondence, and the embodiments of the present disclosure is not limited thereto. In some embodiments, one PDCP entity can correspond to a plurality of RLCs.

Taking the 5G network and the XR service as an example, compared with a downlink XR services, the existing 5G network needs to enhance the support for the uplink XR service. The uplink transmission capacity of the wireless network is generally lower than the downlink transmission capacity, and the data rate of the XR service is much higher than other types of services. If the data of the XR service is still transmitted in the existing way, the transmission requirement for the XR service cannot be met. Therefore, using 5G network to transmit the uplink XR service, especially the video service, has become the focus of network enhancement.

Figure 3:
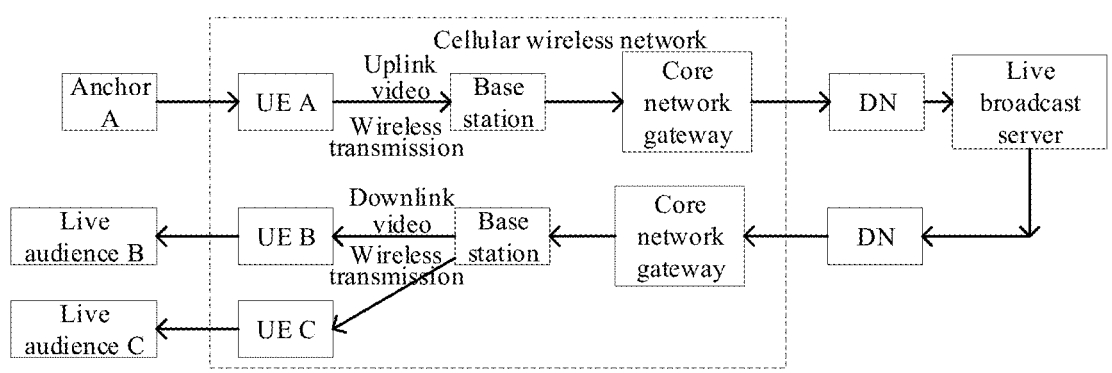
FIG. 3 is a schematic diagram of data transmission process in a live video scene.

The main application scenes of the XR service include live video. The camera in the live broadcast room generates video data, which is transmitted to the base station through the uplink channel of the 5G cellular network, then transmitted to the live broadcast server through the core network gateway, and then transmitted to the live broadcast audience by the live broadcast server. With reference to FIG. 3, the transmission process of data in the live video scene is introduced.

In the example shown in FIG. 3, an anchor A, a live audience B and a live audience C are all connected through wireless networks. In FIG. 3, the portion inside the dashed box belongs to the cellular wireless network, and the portion outside the dashed box belongs to the application layer or the external data network. The cellular wireless network within the dotted box may be a 5G network, a 4G network, a future 6G network, etc., which is not specifically limited in the embodiments of the present disclosure. In FIG. 3, the transmission between UE and the base station is through a wireless channel, and the transmission between other devices can be through a wired channel. As can be seen from the transmission process in FIG. 3, the wireless channel is the weak link of the whole transmission channel. The above transmission process involves the transmission of wireless channels at two places: UE A transmits uplink video data to the base station through the wireless channel, and UE B and UE C receive downlink video data from the base station through the wireless channels.

In the existing communication system, the uplink radio resource available by the UE to transmit uplink data is allocated by the base station. When the UE has data to send, it can send a buffer state report (BSR) to the base station. The BSR can be configured to indicate data volume to be transmitted by the UE. For example, the BSR can indicate to the base station that "the UE has XXX bytes of uplink data to transmit". The base station can allocate the uplink resource for the UE according to the BSR sent by the UE. The UE can send uplink data to the base station according to the uplink resource allocated by the base station.

In the related protocol, the BSR is generated by a medium access control (MAC) entity of the UE, which is a MAC control element (CE). The MAC CE has a 5-bit or 8-bit value, and each code point (or each index value) represents a data volume interval of the data to be transmitted.

Taking 5 bits as an example, Table 1 shows the corresponding relationship between BSR index and a range of data volume. Table 1 can also be referred to as a BSR table.

TABLE 1

| Code point | BSR value |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

As can be seen from Table 1, the intervals of the data volume represented by different code points are different. The smaller the absolute value of the data volume is, the smaller a range of the data volume interval corresponding to a code point is, that is, the more accurate the data volume reported by the BSR is. On the contrary, the greater the absolute value of the data volume is, the larger the range of the data volume interval corresponding to the code point is, that is, the inaccurate the data volume reported by the BSR is. For example, when the code point is 4, the corresponding data volume ranges from 21 bytes to 28 bytes. When the idx is 27, the corresponding data volume ranges from 39819 bytes to 55474 bytes. Therefore, when the data volume is very small, the base station can allocate the uplink radio resources for the UE once to transmit all the data with reported data volume, and the accurate data volume can prevent the base station from allocating too many resources. When the data volume is large, the base station needs to allocate the uplink radio resources to the UE for many times, and the subsequent UE may report to the BSR again, so there is no problem of wasting radio resources and there is no need for the BSR to report accurate data volume.

After the introduction of XR service, the mainstream transmission data is video data. The data volume of video data is very large. Depending on the resolution, the data volume of each video frame can range from 10000 bytes to 30000 bytes. If the UE reports XR data through the BSR, the accuracy of reporting is rough according to Table 1. In addition, the data of a video frame of the XR service needs to be transmitted within a range from 3 ms to 5 ms, which takes up a lot of wireless resources. The base station needs to allocate corresponding resources for the UE to transmit the data of the video frame within the range from 3 ms to 5 ms, during which the UE generally does not report to the BSR again. If the base station cannot accurately determine the data volume of a video frame, there are two processing methods: allocating the uplink resources according to the maximum data volume and allocating the uplink resources according to the minimum data volume. If the base station allocates the uplink resources according to the maximum data volume, it leads to the waste of uplink resources. If the base station allocates the uplink resources according to the minimum data volume, it causes the UE to be unable to transmit the data of the whole video frame.

Based on this, 3rd generation partnership project (3GPP) has decided to introduce a new BSR table, similar to the table shown in Table 1. The UE can report BSR according to the new table. The UE can send a data volume of data to be transmitted and a remaining transmission duration corresponding to the data to be transmitted to the base station through a MAC CE. For example, the UE can send a message of "30000Byte, which needs to be transmitted within 4 ms" to the base station. However, the specific details are not specified in the agreement.

Figure 4:
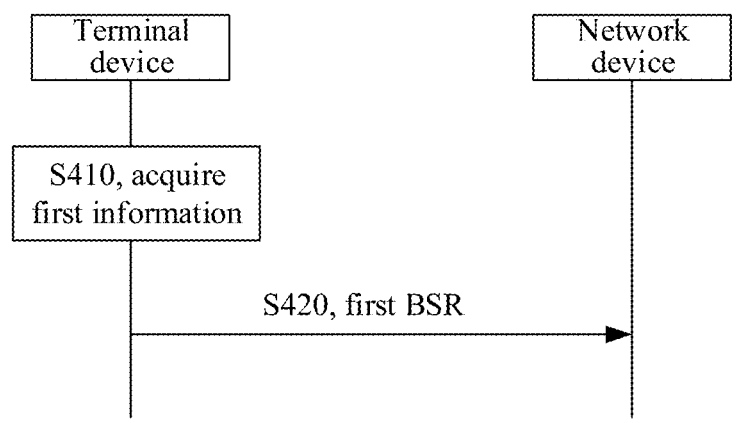
FIG. 4 is a schematic flowchart of a method for transmitting a BSR provided in some embodiments of the present disclosure.

In view of the above problems, a method and a device for transmitting a BSR is provided according to the embodiments of the present disclosure, and a terminal device can transmit the BSR based on first information sent by a network device, thereby determining the method of transmitting the BSR of the terminal device. With reference to FIG. 4, the method according to the embodiments of the present disclosure is described below. The method shown in FIG. 4 includes operations of S410 to S420.

In S410, the terminal device acquires first information.

The way in which the terminal device acquires the first information is not specifically limited in the embodiments of the present disclosure. For example, the terminal device can acquire the first information from the network device, that is, the network device can send the first information to the terminal device. For another example, the first information can be predefined in the protocol, and the terminal device can directly acquire the first information from the interior of the terminal device. In some embodiments, a portion of the first information is sent by the network device to the terminal device, and another portion of the first information is predefined in the protocol.

In step S420, the terminal device sends a first BSR to the network device based on the first information. The first BSR is configured to indicate data volume of data to be transmitted and a remaining transmission duration corresponding to the data to be transmitted.

In some embodiments, the data to be transmitted can be data with high data transmission speed and/or high latency requirement, that is, the data to be transmitted can be data with low latency and large data rate. For example, the data to be transmitted is the XR data as described above.

The remaining transmission duration can be a specific moment or a time interval. For example, the terminal device sends the data to be transmitted corresponding to different moments or the data to be transmitted corresponding to different time intervals to the network device.

A triggering condition for the network device to send the first information is not specifically limited in the embodiments of the present disclosure. The triggering condition can be related to the service type of the terminal device. If the service type of the terminal device is a service with low latency and high data rate, the network device can send the first information to the terminal device. Taking the XR service as an example, if the network device determines that the terminal device is establishing the XR service, or that the terminal device has established the XR service, the network device can send the first information to the terminal device.

The first information can be sent through control signaling, for example, the network device can send the first information to the terminal device through control signaling.

The first information is not limited in the embodiments of the present disclosure. For example, the first information can be configured to indicate at least one of: information related to a first BSR table, data suitable to be included in a statistical range of the first BSR, a triggering condition of the first BSR, a generation method of the first BSR, and a transmission resource used by the first BSR. The first BSR table includes corresponding relationships among BSR code points and the data volume. The first BSR table can be understood as a table similar to Table 1. The difference between the first BSR table and Table 1 is that the first BSR table has corresponding relationships among BSR code points and the data volume different from corresponding relationships among BSR code points and the data volume in Table 1. Hereinafter, the first BSR table is sometimes referred to as the new BSR table, the table similar to Table 1 is referred to as the old BSR table, the BSR generated based on the first BSR table is referred to as the new BSR, and the BSR generated based on the table similar to Table 1 is referred to as the old BSR.

In some embodiments, the first information includes a plurality of sets of information, and the network device can activate one set of the plurality of sets through the second information. The terminal device can send the first BSR to the network device based on the activated set of information.

The above information indicated by the first information is described below.

I. Information Related to a First BSR Table

In some embodiments, the information related to the first BSR table includes at least one of a parameter in the first BSR table or valid time of the first BSR table.

The valid time of the first BSR table includes at least one of: start valid time of the first BSR table, valid duration of the first BSR table, and valid end time of the first BSR table (i.e., start invalid time). Taking the start valid time of the first BSR table as an example.

The network device can indicate the start valid time of the first BSR table by absolute time or relative time.

The relative time is a time relative to configuration time of the first BSR table. The network device can configure the first BSR table for the terminal device. The terminal device can determine the start valid time of the first BSR table based on the moment of receiving the configuration of the first BSR table. The first BSR table is configured for the terminal device by the network device through a radio resource control (RRC) message.

For example, the start valid time of the first BSR table is the moment of receiving the configuration of the first BSR table. The terminal device can assume that in response to receiving the configuration of the first BSR table, the first BSR table takes effect immediately, or in other words, the start valid time of the first BSR table is the moment when the terminal device receives the first BSR table configured by the network device.

For another example, the network device can indicate to the terminal device that the first BSR table takes effect after a preset duration after configuration. The preset duration can be realized by a timer. For example, the network device can configure the timer for the terminal device. In response to receiving the first BSR table, the terminal device can start the timer. After the timer expires, the terminal device can determine that the first BSR table starts to take effect.

In some embodiments, the start valid time of the first BSR table can be an absolute time. The valid time of the first BSR table can be the first time indicated by the network device. The first time can be a specific moment. The network device can indicate to the terminal device that the first time is the start valid time of the first BSR table. For example, the network device can indicate to the terminal device that the first BSR table takes effect when system frame number (SFN) equals to 365, or the network device can indicate to the terminal device that the first BSR table takes effect at 8:34:56 on Nov. 30, 2022.

In some embodiments, the first BSR table can include a plurality of BSR tables. The network device can configure a plurality of BSR tables for the terminal device. The plurality of BSR tables do not take effect immediately after configuration. The plurality of BSR tables are for the terminal device by the network device through the RRC message. In addition, the network device can send a second message to the terminal device. The second message is configured to activate or deactivate at least one BSR table of the plurality of BSR tables. The second message may be MAC CE or downlink control information (DCI). For example, the network device can activate at least one BSR table of the plurality of BSR tables through MAC CE or DCI. After the BSR table is activated, the terminal device can use the BSR table. For another example, the network device deactivates one or more of the plurality of BSR tables through MAC CE or DCI. After the BSR table is deactivated, the terminal device cannot use the BSR table.

For example, the network device can configure K BSR tables for the terminal device, where k represents an integer greater than or equal to 1. After the K BSR tables are configured, the network device can activate K1 BSR tables, where K1 is less than or equal to K.

Different BSR tables correspond to different indexes. When the network device activates the BSR table, it can send the index of the BSR table to be activated to the terminal device.

The parameter in the first BSR table includes at least one of: an upper limit of the data volume, a lower limit of the data volume, a number of bits corresponding to the BSR code points (hereinafter referred to as a number of bits), and step sizes of the BSR code points. The BSR code points can also be referred to as BSR index values. The following is described with reference to FIG. 5 to FIG. 11.

First example: the parameter in the first BSR table includes the upper limit of the data volume, the lower limit of the data volume, and the number of bits.

Assuming that the upper limit of the data volume is 30000 bytes, the lower limit of the data volume is 10000 bytes, and the number of bits is 5.

The terminal device can determine that the BSR table includes 32 code points based on the number of bits being 5. The terminal device determines the step size as (30000-10000)/32=625 bytes based on the upper limit of 30000 bytes and the lower limit of 10,000 bytes. As shown in FIG. 5, in a case that the data volume falls within the range from 10000 bytes to 10625 bytes, the BSR code point 0 is reported by the terminal device. In a case that the data volume falls within the range from 10625 bytes to 11250 bytes, the BSR code point 1 is reported by the terminal device, and so on. In a case that the data volume falls within the range from 29375 bytes to 30000 bytes, the BSR code point 31 is reported by the terminal device.

Second example: the parameter in the first BSR table includes the lower limit of the data volume, the number of bits, and the step sizes of the BSR code points.

Assuming that the lower limit of the data volume is 10000 bytes, the number of bits is 5, and the step size of each BSR code point is 500 bytes. The terminal device can determine that the BSR table includes 32 code points based on the number of bits being 5. The terminal device can determine a BSR reporting interval as shown in FIG. 6 base on the lower limit of 10000 bytes and the step size of 500 bytes.

As shown in FIG. 6, in a case that the data volume falls within the range from 10000 bytes to 10500 bytes, the BSR code point 0 is reported by the terminal device. In a case that the data volume falls within the range from 10500 bytes to 11000 bytes, the BSR code point 1 is reported by the terminal device, and so on. In a case that the data volume falls within the range from 25500 bytes to 26000 bytes, the BSR code point 31 is reported by the terminal device.

Third example: the parameter in the first BSR table includes the upper limit of the data volume, the number of bits, and the step sizes of the BSR code points.

Assuming that the upper limit of the data volume is 30000 bytes, the number of bits is 5, and the step size of each BSR code point is 500 bytes. The terminal device can determine that the BSR table includes 32 code points based on the number of bits being 5. The terminal device can determine a BSR reporting interval as shown in FIG. 7 base on the upper limit of 30000 bytes and the step size of 500 bytes.

As shown in FIG. 7, in a case that the data volume falls within the range from 14000 bytes to 14500 bytes, the BSR code point 0 is reported by the terminal device. In a case that the data volume falls within the range from 14500 bytes to 15000 bytes, the BSR code point 1 is reported by the terminal device, and so on. In a case that the data volume falls within the range from 29500 bytes to 30000 bytes, the BSR code point 31 is reported by the terminal device.

The first example to the third example all show the cases that the first BSR table has the upper data limit and the lower data limit. In some embodiments, the first BSR table may not have an upper data limit and/or a lower data limit. The following is described with reference to FIG. 8 to FIG. 11.

Fourth example: the parameter in the first BSR table includes the lower limit of the data volume, the number of bits, and the step sizes of the BSR code points. The first BSR table does not include an upper limit of the data volume.

Assuming that the lower limit of the data volume of the first BSR table is 10000 bytes, the number of bits is 5, and the step size of each BSR code point is 500 bytes, the terminal device can determine a reporting interval as shown in FIG. 8. In the reporting interval shown in FIG. 8, there is no upper limit of the data volume. As long as the data volume is greater than 29500 bytes, the BSR code point 31 is reported by the terminal device.

Fifth example: the parameter in the first BSR table includes the upper limit of the data volume, the number of bits, and the step sizes of the BSR code points. The first BSR table does not include a lower limit of the data volume.

Assuming that the upper limit of the data volume of the first BSR table is 30000 bytes, the number of bits is 5, and the step size of each BSR code point is 500 bytes, the terminal device can determine a reporting interval as shown in FIG. 9. In the reporting interval shown in FIG. 9, there is no lower limit of the data volume. As long as the data volume is less than 14500 bytes, the BSR code point 0 is reported by the terminal device.

In the first example to the fifth example, the step sizes of different intervals are the same, which is not limited in the embodiments of the present disclosure embodiment. The step size of different intervals can also be different, that is, the step sizes can be irregular. The change mode of the step sizes is not specifically limited in the embodiments of the present disclosure. For example, the step sizes can be increased or decreased step by step according to the fixed bytes per step. For another example, the step size of each step can be randomly determined.

The following is described with reference to FIG. 10 and FIG. 11.

Sixth example: the parameter in the first BSR table includes the lower limit of the data volume, the number of bits, and the irregular step sizes of the BSR code points.

Assuming that the lower limit of the data volume is 10000 bytes, the number of bits is 5, the initial step size is 500 bytes, and the subsequent step size is increased by 50 bytes per step, the terminal device can determine a reporting interval as shown in FIG. 10. In the reporting interval shown in FIG. 10, the step size corresponding to the BSR code point 0 is 500 bytes, the step size corresponding to the BSR code point 1 is 550 bytes, and so on. The step size corresponding to BSR code point 31 is 2050 bytes.

Seventh example: the parameter in the first BSR table includes the upper limit of the data volume, the number of bits and the irregular step sizes.

Assuming that the upper limit of the data volume is 28500 bytes, the number of bits is 5 bits, the initial step size is 2050 bytes, and the subsequent step size is reduced by 50 bytes per step, the terminal device can determine a reporting interval as shown in FIG. 11. In the reporting interval shown in FIG. 11, the step size corresponding to the BSR code point 31 is 2050 bytes, the step size corresponding to the BSR code point 30 is 2000 bytes, and so on. The step size corresponding to BSR code point 0 is 500 bytes.

In the technical solution shown in FIG. 10, the first BSR table may or may not have an upper limit of the data volume. For example, if the data volume is greater than 26450 bytes, the BSR code point 31 is reported by the terminal device, that is to say, the BSR code point 31 can indicate the case where the data volume is greater than 26450 bytes.

In the technical solution shown in FIG. 11, the first BSR table may or may not have a lower limit of the data volume. For example, if the data volume is less than 10550 bytes, the BSR code point 0 is reported by the terminal device, that is to say, the BSR code point 0 can indicate the case where the data volume is less than 10550 bytes.

The step sizes of the first BSR table can be agreed between the terminal device and the network device, or stipulated in the protocol, or indicated to the terminal device by the network device. For example, the protocol can specify a plurality of sets of step sizes, and the network device can indicate one set of the plurality of sets of step sizes to the terminal device. For another example, the network device can configure the step sizes for the terminal device. The step sizes can be configured by the network device through the RRC message.

The above description takes the number of bits being 5 as an example, which is not limited in the embodiments of the present disclosure. The number of bits can also be other numerical values, for example, the number of bits can be 6, 8 and so on.

II. Data Suitable to be Included in a Statistical Range of the First BSR

In some embodiments, the terminal device can include all the data in the statistical range of the first BSR, or only a portion of the data can be included in the statistical range of the first BSR. The data suitable to be included in the statistical range of the first BSR can be configured by the network device for terminal device, or be predefined in the protocol. The following is a description to the data suitable to be included in the statistical range of the first BSR.

In some embodiments, the data that can be included in the statistical range of the first BSR is related to a first parameter corresponding to the data to be transmitted. The first parameter includes at least one of: a logical channel (LCH), a logical channel group (LCG), a DRB, a PDCP, RLC, a QoS stream, a PDU set, a remaining transmission duration, and a transmission resource.

In some embodiments, the data suitable to be included in the statistical range of the first BSR satisfies at least one condition of: the first parameter corresponding to the data to be transmitted belongs to preset first parameters, the first parameter corresponding to the data to be transmitted meets a preset threshold requirement, or the data to be transmitted meets a requirement of statistical granularity. The statistical granularity is related to the first parameter.

The preset first parameters can be configured by the network device for the terminal device, or predefined in the protocol. The preset first parameters may include parameters defined in a parameter interval or parameters listed in a parameter list, which is not specifically limited in the present disclosure embodiment.

The preset threshold can be configured by the network device for the terminal device, or predefined in the protocol. Different first parameters may correspond to different preset thresholds.

If the first BSR table includes a plurality of BSR tables, a respective corresponding relationship between each BSR table of the plurality of BSR tables and the first parameter is configured by the network equipment. That is to say, the network device can configure corresponding data suitable to be included in the statistical range of the BSR for different BSR tables.

As an example, the data suitable to be included in the statistical range of the first BSR satisfies at least one condition: the logical channel corresponding to the data to be transmitted belongs to preset logical channels, the logical channel corresponding to the data to be transmitted meets a preset logical channel threshold requirement, the logical channel group corresponding to the data to be transmitted belongs to preset logical channel groups, the logical channel group corresponding to the data to be transmitted meets a preset logical channel group threshold requirement, the DRB corresponding to the data to be transmitted belongs to preset DRBs, the DRB corresponding to the data to be transmitted meets a preset DRB threshold requirement, the PDCP corresponding to the data to be transmitted belongs to preset PDCPs, the PDCP corresponding to the data to be transmitted meets a preset PDCP threshold requirement, the RLC corresponding to the data to be transmitted belongs to preset RLCs, the RLC corresponding to the data to be transmitted meets a preset RLC threshold requirement, the QoS stream corresponding to the data to be transmitted belongs to preset QoS streams, the PDU set corresponding to the data to be transmitted belongs to preset PDU sets, a PDU set type corresponding to the data to be transmitted belongs to preset PDU set types, the remaining transmission duration corresponding to the data to be transmitted is lower than a first duration threshold, the remaining transmission duration corresponding to the data to be transmitted is higher than a second duration threshold, and the transmission resource corresponding to the data to be transmitted does not belong to dedicated resources.

The above conditions are described in detail separately.

(1) Logical Channel

Data suitable to be included in the statistical range of the first BSR can be data of all logical channels or data of some logical channels. The specific data corresponding to which logical channels suitable to be included in the statistical range of the first BSR can be configured by the network device to terminal device. If the network device configures a plurality of BSR tables for the terminal device, such as BSR table 1 and BSR table 2, the network device can indicate to the terminal device which logical channels corresponding to the data suitable to be included in the statistical range of BSR Table 1 and which logical channels corresponding to the data suitable to be included in the statistical range of BSR Table 2.

In some embodiments, the network device can indicate a preset logical channel suitable to be included in the statistical range of the first BSR. If the logical channel corresponding to the data to be transmitted belongs to the preset logical channels, the data to be transmitted is suitable to be included in the statistical range of the first BSR. The preset logical channels may include the identification (or the reference numeral) of the logical channel.

The preset logical channels may include logical channels listed in a logical channel list or logical channels defined in a logical channel interval. For example, the network device can enumerate all logical channels suitable to be included in the statistical range of BSR. The logical channel interval can be an open interval or a closed interval. For example, the network device can indicate that the data from LCH 1, LCH 2, LCH 3 and LCH is suitable to be included in the statistical range of the first BSR, or that the data from LCH 1 to LCH 5 is suitable to be included in the statistical range of the first BSR, or that the data from LCH with a reference numeral less than 5 is suitable to be included in the statistical range of the first BSR, or that the data from LCH with a reference numeral greater than 6 is suitable to be included in the statistical range of the first BSR.

In some embodiments, the network device may indicate a preset logical channel threshold suitable to be included in the statistical range of the first BSR. If the logical channel corresponding to the data to be transmitted meets a preset logical channel threshold requirement, the data to be transmitted is suitable to be included in the statistical range of the first BSR.

The preset logical channel thresholds may include a lowest threshold and/or a highest threshold. If the index value (or the reference numeral) of the logical channel corresponding to the data to be transmitted is higher than the lowest threshold and/or lower than the highest threshold, the data to be transmitted is suitable to be included in the statistical range of the first BSR.

For example, the preset logical channel thresholds include the lowest threshold, such as LCH 1. If the reference numeral of the logical channel is greater than 1, the data of the logical channel is suitable to be included in the first BSR statistical range. For another example, the preset logical channel thresholds include the highest threshold, such as LCH 8. If the reference numeral of the logical channel is less than 8, the data of the logical channel is suitable to be included in the first BSR statistical range. For another example, the preset logical channel thresholds include the lowest threshold LCH 2 and the highest threshold LCH 7. If the reference numeral of the logical channel ranges from 2 to 7, the data of the logical channel is suitable to be included in the first BSR statistical range.

(2) Logical Channel Group

Data suitable to be included in the statistical range of the first BSR can be data of all logical channel groups or data of some logical channel groups. The specific data corresponding to which logical channel groups are suitable to be included in the statistical range of the first BSR can be configured by the network device to terminal device. If the network device configures a plurality of BSR tables for the terminal device, such as BSR table 1 and BSR table 2, the network device can indicate to the terminal device which logical channels corresponding to the data suitable to be included in the statistical range of BSR Table 1 and which logical channels corresponding to the data suitable to be included in the statistical range of BSR Table 2.

In some embodiments, the network device can indicate preset logical channel groups suitable to be included in the statistical range of the first BSR. If the logical channel group corresponding to the data to be transmitted belongs to the preset logical channel groups, the data to be transmitted is suitable to be included in the statistical range of the first BSR. The preset logical channel groups may include the identification (or the reference numeral) of the logical channel group.

The preset logical channel groups may include logical channel groups listed in a logical channel group list or logical channel groups defined in a logical channel group interval. For example, the network device can enumerate all logical channel groups suitable to be included in the statistical range of BSR. The logical channel group interval can be an open interval or a closed interval. For example, the network device can indicate that the data from LCG 1, LCG 2, LCG 3 and LCG 5 is suitable to be included in the statistical range of the first BSR, or that the data from LCG 1 to LCG 5 is suitable to be included in the statistical range of the first BSR, or that the data from LCH with a reference numeral less than 5 is suitable to be included in the statistical range of the first BSR, or that the data of LCG with a reference numeral greater than 6 is suitable to be included in the statistical range of the first BSR.

In some embodiments, the network device may indicate a preset logical channel group threshold suitable to be included in the statistical range of the first BSR. If the logical channel group corresponding to the data to be transmitted meets a preset logical channel group threshold requirement, the data to be transmitted is suitable to be included in the statistical range of the first BSR.

The preset logical channel group thresholds may include a lowest threshold and/or a highest threshold. If the index value (or the reference numeral) of the logical channel group corresponding to the data to be transmitted is higher than the lowest threshold and/or lower than the highest threshold, the data to be transmitted is suitable to be included in the statistical range of the first BSR.

For example, the preset logical channel group thresholds include the lowest threshold, such as LCG 1. If the reference numeral of the logical channel group is greater than 1, the data of the logical channel group is suitable to be included in the first BSR statistical range. For another example, the preset logical channel group thresholds include the highest threshold, such as LCG 8. If the reference numeral of the logical channel group is less than 8, the data of the logical channel group is suitable to be included in the first BSR statistical range. For another example, the preset logical channel group thresholds include the lowest threshold LCG 2 and the highest threshold LCG 7. If the reference numeral of the logical channel group ranges from 2 to 7, the data of the logical channel group is suitable to be included in the first BSR statistical range.

(3) DRB

Data suitable to be included in the statistical range of the first BSR can be data of all DRBs or data of some DRBs. The specific data corresponding to which DRBs suitable to be included in the statistical range of the first BSR can be configured by the network device to terminal device. If the network device configures a plurality of BSR tables for the terminal device, such as BSR table 1 and BSR table 2, the network device can indicate to the terminal device which DRBs corresponding to the data suitable to be included in the statistical range of BSR Table 1 and which DRBs corresponding to the data suitable to be included in the statistical range of BSR Table 2.

In some embodiments, the network device can indicate preset DRBs suitable to be included in the statistical range of the first BSR. If the DRB corresponding to the data to be transmitted belongs to the preset DRBs, the data to be transmitted is suitable to be included in the statistical range of the first BSR. The preset DRBs may include the identification (or the reference numeral) of the DRB.

The preset DRBs may include DRBs listed in a DRB list or DRBs defined in a DRB interval. For example, the network device can enumerate all DRBs suitable to be included in the statistical range of BSR. The DRB interval can be an open interval or a closed interval. For example, the network device can indicate that the data from DRB 1, DRB 2, DRB 3 and DRB 5 is suitable to be included in the statistical range of the first BSR, or that the data from DRB 1 to DRB 5 is suitable to be included in the statistical range of the first BSR, or that the data from DRB with a reference numeral less than 5 is suitable to be included in the statistical range of the first BSR, or that the data of DRB with a reference numeral greater than 6 is suitable to be included in the statistical range of the first BSR.

In some embodiments, the network device may indicate preset DRB thresholds suitable to be included in the statistical range of the first BSR. If the DRB corresponding to the data to be transmitted meets a preset DRB threshold requirement, the data to be transmitted is suitable to be included in the statistical range of the first BSR.

The preset DRB thresholds may include a lowest threshold and/or a highest threshold. If the index value (or reference numeral) of the DRB corresponding to the data to be transmitted is higher than the lowest threshold and/or lower than the highest threshold, the data to be transmitted is suitable to be included in the statistical range of the first BSR.

For example, the preset DRB thresholds include the lowest threshold, such as DRB 1. If the reference numeral of the DRB is greater than 1, the data of the DRB is suitable to be included in the first BSR statistical range. For another example, the preset DRB thresholds include the highest threshold, such as DRB 8. If the reference numeral of the DRB is less than 8, the data of the DRB is suitable to be included in the first BSR statistical range. For another example, the preset DRB thresholds include the lowest threshold DRB 2 and the highest threshold DRB 7. If the reference numeral of the DRB ranges from 2 to 7, the data of the DRB is suitable to be included in the first BSR statistical range.

(4) PDCP

Data suitable to be included in the statistical range of the first BSR may be data of all PDCPs or data of some PDCPs. The specific data corresponding to which PDCPs suitable to be included in the statistical range of the first BSR can be configured by the network device to terminal device. If the network device configures a plurality of BSR tables for the terminal device, such as BSR table 1 and BSR table 2, the network device can indicate to the terminal device which PDCPs corresponding to the data suitable to be included in the statistical range of BSR Table 1 and which PDCPs corresponding to the data suitable to be included in the statistical range of BSR Table 2.

In some embodiments, the network device can indicate preset PDCPs suitable to be included in the statistical range of the first BSR. If the PDCP corresponding to the data to be transmitted belongs to the preset PDCPs, the data to be transmitted is suitable to be included in the statistical range of the first BSR. The preset PDCPs may include the identification (or the reference numeral) of the PDCP.

The preset PDCPs may include PDCPs listed in a PDCP list or PDCPs defined in a PDCP interval. For example, the network device can enumerate all PDCPs suitable to be included in the statistical range of BSR. The PDCP interval can be an open interval or a closed interval. For example, the network device can indicate that the data from PDCP 1, PDCP 2, PDCP 3 and PDCP 5 is suitable to be included in the statistical range of the first BSR, or that the data from PDCP 1 to PDCP 5 is suitable to be included in the statistical range of the first BSR, or that the data from PDCP with a reference numeral less than 5 is suitable to be included in the statistical range of the first BSR, or that the data of PDCP with a reference numeral greater than 6 is suitable to be included in the statistical range of the first BSR.

In some embodiments, the network device may indicate preset PDCP thresholds suitable to be included in the statistical range of the first BSR. If the PDCP corresponding to the data to be transmitted meets a preset PDCP threshold requirement, the data to be transmitted is suitable to be included in the statistical range of the first BSR.

The preset PDCP thresholds may include a lowest threshold and/or a highest threshold. If the index value (or the reference numeral) of the PDCP corresponding to the data to be transmitted is higher than the lowest threshold and/or lower than the highest threshold, the data to be transmitted is suitable to be included in the statistical range of the first BSR.

For example, the preset PDCP thresholds include the lowest threshold, such as PDCP 1. If the reference numeral of the PDCP is greater than 1, the data of the PDCP is suitable to be included in the first BSR statistical range. For another example, the preset PDCP thresholds include the highest threshold, such as PDCP 8. If the reference numeral of the PDCP is less than 8, the data of the PDCP is suitable to be included in the first BSR statistical range. For another example, the preset PDCP thresholds include the lowest threshold PDCP 2 and the highest threshold PDCP 7. If the reference numeral of the PDCP ranges from 2 to 7, the data of the PDCP is suitable to be included in the first BSR statistical range.

(5) RLC

Data suitable to be included in the statistical range of the first BSR can be data of all RLCs or data of some RLCs. The specific data corresponding to which RLCs suitable to be included in the statistical range of the first BSR can be configured by the network device to terminal device. If the network device configures a plurality of BSR tables for the terminal device, such as BSR table 1 and BSR table 2, the network device can indicate to the terminal device which RLCs corresponding to the data suitable to be included in the statistical range of BSR Table 1 and which RLCs corresponding to the data suitable to be included in the statistical range of BSR Table 2.

In some embodiments, the network device can indicate preset RLCs suitable to be included in the statistical range of the first BSR. If the RLC corresponding to the data to be transmitted belongs to the preset RLCs, the data to be transmitted is suitable to be included in the statistical range of the first BSR. The preset RLCs may include the identification (or the reference numeral) of the RLC.

The preset RLCs may include RLCs listed in an RLC list or RLCs defined in an RLC interval. For example, the network device can enumerate all RLCs suitable to be included in the statistical range of BSR. The RLC interval can be an open interval or a closed interval. For example, the network device can indicate that the data from RLC 1, RLC 2, RLC 3 and RLC 5 is suitable to be included in the statistical range of the first BSR, or that the data from RLC 1 to RLC 5 is suitable to be included in the statistical range of the first BSR, or that the data from RLC with a reference numeral less than 5 is suitable to be included in the statistical range of the first BSR, or that the data of RLC with a reference numeral greater than 6 is suitable to be included in the statistical range of the first BSR.

In some embodiments, the network device may indicate preset RLC thresholds suitable to be included in the statistical range of the first BSR. If the RLC corresponding to the data to be transmitted meets a preset RLC threshold requirement, the data to be transmitted is suitable to be included in the statistical range of the first BSR.

The preset RLC thresholds may include a lowest threshold and/or a highest threshold. If the index value (or the reference numeral) of the RLC corresponding to the data to be transmitted is higher than the lowest threshold and/or lower than the highest threshold, the data to be transmitted is suitable to be included in the statistical range of the first BSR.

For example, the preset RLC thresholds include the lowest threshold, such as RLC 1. If the reference numeral of the RLC is greater than 1, the data of the RLC is suitable to be included in the first BSR statistical range. For another example, the preset RLC thresholds include the highest threshold, such as RLC 8. If the reference numeral of the RLC is less than 8, the data of the RLC is suitable to be included in the first BSR statistical range. For another example, the preset RLC thresholds include the lowest threshold RLC 2 and the highest threshold RLC 7. If the reference numeral of the RLC ranges from 2 to 7, the data of the RLC is suitable to be included in the first BSR statistical range.

(6) QoS Stream

Data suitable to be included in the statistical range of the first BSR can be data of all QoS streams or data of some QoS streams. The specific data corresponding to which QoS streams suitable to be included in the statistical range of the first BSR can be configured by the network device to terminal device. If the network device configures a plurality of BSR tables for the terminal device, such as BSR table 1 and BSR table 2, the network device can indicate to the terminal device which QoS streams corresponding to the data suitable to be included in the statistical range of BSR Table 1 and which QoS streams corresponding to the data suitable to be included in the statistical range of BSR Table 2.

In some embodiments, the network device can indicate preset QoS streams suitable to be included in the statistical range of the first BSR. If the QoS stream corresponding to the data to be transmitted belongs to the preset QoS streams, the data to be transmitted is suitable to be included in the statistical range of the first BSR. The preset QoS streams may include the identification (or the reference numeral) of the QoS stream.

The preset QoS streams may include QoS streams listed in a QoS stream list or QoS streams defined in a QoS stream interval. For example, the network device can enumerate all QoS streams suitable to be included in the statistical range of BSR. The QoS stream interval can be an open interval or a closed interval. For example, the network device can indicate that the data from QoS stream 1, QoS stream 2, QoS stream 3 and QoS stream 5 is suitable to be included in the statistical range of the first BSR, or that the data from QoS stream 1 to QoS stream 5 is suitable to be included in the statistical range of the first BSR, or that the data from QoS stream with a reference numeral less than 5 is suitable to be included in the statistical range of the first BSR, or that the data of QoS stream with a reference numeral greater than 6 is suitable to be included in the statistical range of the first BSR.

In some embodiments, the network device may indicate a preset QoS stream threshold suitable to be included in the statistical range of the first BSR. If the QoS stream corresponding to the data to be transmitted meets a preset QoS stream threshold requirement, the data to be transmitted is suitable to be included in the statistical range of the first BSR.

The preset QoS stream thresholds may include a lowest threshold and/or a highest threshold. If the index value (or the reference numeral) of the QoS stream corresponding to the data to be transmitted is higher than the lowest threshold and/or lower than the highest threshold, the data to be transmitted is suitable to be included in the statistical range of the first BSR.

For example, the preset QoS stream thresholds include the lowest threshold, such as QoS stream 1. If the reference numeral of the QoS stream is greater than 1, the data of the QoS stream is suitable to be included in the first BSR statistical range. For another example, the preset QoS stream thresholds include the highest threshold, such as QoS stream 8. If the reference numeral of the QoS stream is less than 8, the data of the QoS stream is suitable to be included in the first BSR statistical range. For another example, the preset QoS stream thresholds include the lowest threshold QoS stream 2 and the highest threshold QoS stream 7. If the reference numeral of the QoS stream ranges from 2 to 7, the data of the QoS stream is suitable to be included in the first BSR statistical range.

(7) PDU Set

Data suitable to be included in the statistical range of the first BSR can be data of all PDU sets or data of some PDU sets. The specific data corresponding to which PDU sets suitable to be included in the statistical range of the first BSR can be configured by the network device to terminal device. If the network device configures a plurality of BSR tables for the terminal device, such as BSR table 1 and BSR table 2, the network device can indicate to the terminal device which PDU sets corresponding to the data suitable to be included in the statistical range of BSR Table 1 and which PDU sets corresponding to the data suitable to be included in the statistical range of BSR Table 2.

In some embodiments, the network device can indicate preset PDU sets suitable to be included in the statistical range of the first BSR. If the PDU set corresponding to the data to be transmitted belongs to the preset PDU sets, the data to be transmitted is suitable to be included in the statistical range of the first BSR. The preset PDU sets may include the identification (or the reference numeral) of the PDU set.

The preset PDU sets may include PDU sets listed in a PDU set list or PDU sets defined in a PDU set interval. For example, the network device can enumerate all PDU sets suitable to be included in the statistical range of BSR. The PDU set interval can be an open interval or a closed interval. For example, the network device can indicate that the data from PDU set 1, PDU set 2, PDU set 3 and PDU set 5 is suitable to be included in the statistical range of the first BSR, or that the data from PDU set 1 to PDU set 5 is suitable to be included in the statistical range of the first BSR, or that the data from PDU set with a reference numeral less than 5 is suitable to be included in the statistical range of the first BSR, or that the data of PDU set with a reference numeral greater than 6 is suitable to be included in the statistical range of the first BSR.

In some embodiments, the network device may indicate preset PDU set thresholds suitable to be included in the statistical range of the first BSR. If the PDU set corresponding to the data to be transmitted meets a preset PDU set threshold requirement, the data to be transmitted can be included in the statistical range of the first BSR.

The preset PDU set thresholds may include a lowest threshold and/or a highest threshold. If the index value (or the reference numeral) of the PDU set corresponding to the data to be transmitted is higher than the lowest threshold and/or lower than the highest threshold, the data to be transmitted is suitable to be included in the statistical range of the first BSR.

For example, the preset PDU set thresholds include the lowest threshold, such as PDU set 1. If the reference numeral of the PDU set is greater than 1, the data of the PDU set is suitable to be included in the first BSR statistical range. For another example, the preset PDU set thresholds include the highest threshold, such as PDU set 8. If the reference numeral of the PDU set is less than 8, the data of the PDU set is suitable to be included in the first BSR statistical range. For another example, the preset PDU set thresholds include the lowest threshold PDU set 2 and the highest threshold PDU set 7. If the reference numeral of the PDU set ranges from 2 to 7, the data of the PDU set is suitable to be included in the first BSR statistical range.

(8) PDU Set Type

Data suitable to be included in the statistical range of the first BSR can be data of all PDU set types or data of some PDU set types. The specific data corresponding to which PDU set types suitable to be included in the statistical range of the first BSR can be configured by the network device to terminal device. If the network device configures a plurality of BSR tables for the terminal device, such as BSR table 1 and BSR table 2, the network device can indicate to the terminal device which PDU set types corresponding to the data suitable to be included in the statistical range of BSR Table 1 and which PDU set types corresponding to the data suitable to be included in the statistical range of BSR Table 2.

In some embodiments, the network device can indicate preset PDU set types suitable to be included in the statistical range of the first BSR. If the PDU set type corresponding to the data to be transmitted belongs to the preset PDU set types, the data to be transmitted is suitable to be included in the statistical range of the first BSR. The preset PDU set types may include the identification (or the reference numeral) of the PDU set type.

The preset PDU set types may include PDU set types listed in a PDU set type list or PDU set types defined in a PDU set type interval. For example, the network device can enumerate all PDU set types suitable to be included in the statistical range of BSR. The PDU set type interval can be an open interval or a closed interval. For example, the network device can indicate that the data from PDU set type 1, PDU set type 2, PDU set type 3 and PDU set type 5 is suitable to be included in the statistical range of the first BSR, or that the data from PDU set type 1 to PDU set type 5 is suitable to be included in the statistical range of the first BSR, or that the data from PDU set type with a reference numeral less than 5 is suitable to be included in the statistical range of the first BSR, or that the data of PDU set type with a reference numeral greater than 6 is suitable to be included in the statistical range of the first BSR.

In some embodiments, the network device may indicate preset PDU set type thresholds suitable to be included in the statistical range of the first BSR. If the PDU set type corresponding to the data to be transmitted meets a preset PDU set type threshold requirement, the data to be transmitted is suitable to be included in the statistical range of the first BSR.

The preset PDU set type thresholds may include a lowest threshold and/or a highest threshold. If the index value (or the reference numeral) of the PDU set type corresponding to the data to be transmitted is higher than the lowest threshold and/or lower than the highest threshold, the data to be transmitted is suitable to be included in the statistical range of the first BSR.

For example, the preset PDU set type thresholds include the lowest threshold, such as PDU set type 1. If the reference numeral of the PDU set type is greater than 1, the data of the PDU set type is suitable to be included in the first BSR statistical range. For another example, the preset PDU set type thresholds include the highest threshold, such as PDU set type 8. If the reference numeral of the PDU set type is less than 8, the data of the PDU set type is suitable to be included in the first BSR statistical range. For another example, the preset PDU set type thresholds include the lowest threshold PDU set type 2 and the highest threshold PDU set type 7. If the reference numeral of the PDU set type is ranges from 2 to 7, the data of the PDU set type is suitable to be included in the first BSR statistical range.

(9) Remaining Transmission Duration

Data suitable to be included in the statistical range of the first BSR can be data of all remaining transmission durations or data of some remaining transmission durations. The specific data corresponding to which remaining transmission durations suitable to be included in the statistical range of the first BSR can be configured by the network device to terminal device. If the network device configures a plurality of BSR tables for the terminal device, such as BSR table 1 and BSR table 2, the network device can indicate to the terminal device which remaining transmission durations corresponding to the data suitable to be included in the statistical range of BSR Table 1 and which remaining transmission durations corresponding to the data suitable to be included in the statistical range of BSR Table 2.

In some embodiments, the network device can indicate preset remaining transmission durations suitable to be included in the statistical range of the first BSR. If the remaining transmission duration corresponding to the data to be transmitted belongs to the preset remaining transmission durations, the data to be transmitted is suitable to be included in the statistical range of the first BSR.

The preset remaining transmission durations may include remaining transmission durations defined in one remaining transmission duration interval or a plurality of remaining transmission duration intervals. For example, the network device can enumerate all remaining transmission durations suitable to be included in the statistical range of BSR. The remaining transmission duration interval can be an open interval or a closed interval. For example, the network device can indicate that the data with the remaining transmission duration ranging from A ms to B ms is suitable to be included in the statistical range of the first BSR, or that the data with the remaining transmission duration greater than A ms is suitable to be included in the statistical range of the first BSR, or that the data with the remaining transmission duration less than B ms is suitable to be included in the statistical range of the first BSR. A is less than B.

In some embodiments, the network device may indicate preset remaining transmission duration thresholds suitable to be included in the statistical range of the first BSR. If the remaining transmission duration corresponding to the data to be transmitted meets a preset remaining transmission duration threshold requirement, the data to be transmitted is suitable to be included in the statistical range of the first BSR.

The preset remaining transmission duration thresholds may include a lowest threshold and/or a highest threshold. Hereinafter, the highest threshold is referred to as a first duration threshold, and the lowest threshold is referred to as a second duration threshold. If the index value (or the reference numeral) of the remaining transmission duration corresponding to the data to be transmitted is higher than the first duration threshold and/or lower than the second duration threshold, the data to be transmitted is suitable to be included in the statistical range of the first BSR.

If the preset remaining transmission duration thresholds include the first duration threshold, the data with the remaining transmission duration less than the first duration threshold is suitable to be included in the statistical range of the first BSR by the terminal device. That is to say, only when the duration from the current moment to the data invalidation moment is lower than the first duration threshold, the data is included in the statistical range of the first BSR, which can ensure that the terminal device can prioritize the transmission of data with high latency requirements, thereby improving data transmission performance.

If the preset remaining transmission duration thresholds include the second duration threshold, the data with the remaining transmission duration greater than the second duration threshold is suitable to be included in the first BSR statistical range. That is to say, only when the duration from the current moment to the data invalidation moment is higher than the second duration threshold, the data is included in the statistical range of the first BSR. After the data packet is generated, it needs to be transmitted within a certain duration. Otherwise, after exceeding the duration, it is invalid even if the data packet is transmitted to the receiver. By setting a second duration threshold, the terminal device can be prevented from including data that is immediately timeout and invalid in the statistical range of the first BSR statistical. Since the network device needs a first duration to allocate uplink resources to the terminal device after receiving the first BSR, in reality, this portion of data has already become invalid before the network device allocates the uplink resources. Therefore, by setting the second duration threshold, invalid transmission and waste of resources can be avoided.

If the preset remaining transmission duration thresholds include the first duration threshold and the second duration threshold, the terminal device can include the data with the remaining transmission duration higher than the second duration threshold but lower than the first duration threshold in the statistical range of the first BSR. The first duration threshold can ensure priority transmission of low-latency data, thereby improving data transmission performance. The second duration threshold can avoid including data that is immediately timeout and invalid in the statistical range of the first BSR, thereby avoiding invalid transmission and waste of resources.

(10) Statistical Granularity

The statistical granularity of the first BSR is not limited in the embodiments of the present disclosure. For example, the statistical granularity of the first BSR is a PDU set. Alternatively, the statistical granularity of the first BSR may be other parameters, which can include at least one of: the logical channel, the logical channel group, the DRB, the PDCP, the RLC, or the QoS stream.

Taking the PDU set as an example, the statistical method of the data volume is described below. The terminal device can count the data volume to be transmitted with the PDU as granularity.

In some embodiments, for a PDU set with a portion of data that has been transmitted, a portion of the data that has not been transmitted is suitable to be included in the statistical range of the first BSR. For a PDU set without any data transmission, all data in the PDU set is suitable to be included in the statistical range of the first BSR.

In some embodiments, the embodiments of the present disclosure can also be combined with other conditions corresponding to the data suitable to be included in the statistical range of the first BSR described above, to jointly determine the data suitable to be included in the statistical range of the first BSR. For example, the terminal device can determine the data volume of the data to be transmitted based on the PDU set and the remaining transmission duration corresponding to the data to be transmitted.

Figure 12:
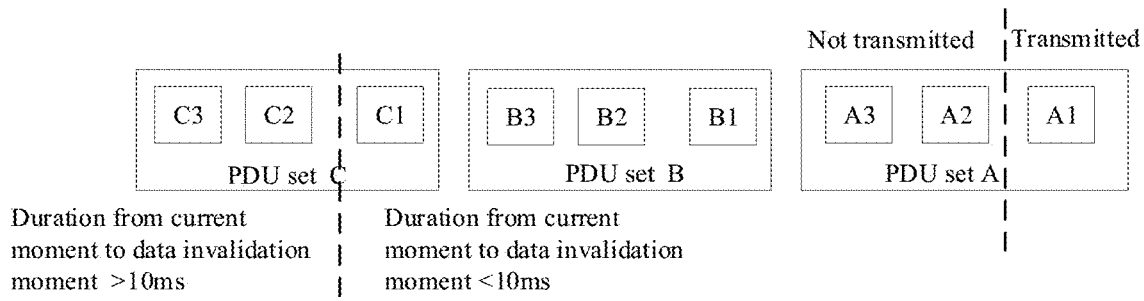
FIG. 12 is a schematic diagram of a method for determining data to be transmitted provided in some embodiments of the present disclosure.

With reference to FIG. 12, the data suitable to be included in the statistical range of the first BSR is described.

The PDU sets shown in FIG. 12 include a PDU set A, a PDU set B and a PDU set C, and each PDU set includes three PDUs. When the terminal device generates the first BSR, a PDU A1 has been transmitted and other PDUs have not been transmitted. Among the PDUs that have not been transmitted, a remaining transmission duration of a PDU C1 and a remaining transmission duration of a PDU C2 are greater than the second duration threshold (for example, 10 ms). In this case, since the data volume to be transmitted is counted with the PDU set as granularity, the terminal device can not only include the PDU C1 in the statistical range, but include the PDU C1, the PDU C2 and the PDU C3 in the statistical range.

(11) Transmission Resource

The terminal device can determine whether the data to be transmitted is suitable to be included in the statistical range of the first BSR based on the transmission resource corresponding to the data to be transmitted. For example, if the transmission resource corresponding to the data to be transmitted is a dedicated resource, the terminal device can not include the data to be transmitted in the statistical range of the first BSR. If the transmission resource corresponding to the data to be transmitted is a dedicated resource, it means that the network device will definitely allocate a resource for the data to be transmitted, and the data to be transmitted can certainly be transmitted. Therefore, the terminal device can not include the data to be transmitted in the statistical range of the first BSR.

The network device can allocate dedicated transmission resources for some services, for example, the network device can allocate dedicated transmission resources using configured grant (CG), or the network device can indicate to the terminal device that "XXX bytes of uplink resources will definitely be allocated using dynamic grant (DG) at a specific moment". Therefore, the terminal device can determine that the data can be transmitted through the pre-configured resources, and the terminal device can not include the data volume of the data packet in the first BSR.

The conditions to be met for the data suitable to be included in the statistical range of the first BSR can be used alone or in combination with each other, which is not limited in the embodiments of the present disclosure.

III. Triggering Condition of the First BSR

The triggering condition of the first BSR is related to a second parameter corresponding to the data to be transmitted and the remaining transmission duration. The second parameter includes at least one of: a PDU set, a QoS stream, a DRB, a PDCP, an RLC, a logical channel, or a logical channel group.

The first BSR can be triggered if the second parameter corresponding to the data to be transmitted meets a preset condition, and/or the first BSR can be triggered if the remaining transmission duration corresponding to the data to be transmitted meets a preset condition.

In some embodiments, the triggering condition of the first BSR is related to at least one of: data corresponding to the second parameter, a priority of the second parameter corresponding to the data to be transmitted, a priority of a type of the second parameter corresponding to the data to be transmitted, or mapping relationships among a plurality of second parameters.

In some embodiments, the triggering condition of the first BSR includes at least one of: the data corresponding to the second parameter is updated, the priority of the second parameter corresponding to the data to be transmitted meets a preset priority threshold requirement, the priority of the second parameter corresponding to the data to be transmitted is within a preset priority range, the priority of the type of the second parameter corresponding to the data to be transmitted meets the preset priority threshold requirement, the priority of the type of the second parameter corresponding to the data to be transmitted is within the preset priority range, the mapping relationships among the plurality of the second parameters are updated, the second parameter corresponding to the data to be transmitted belongs to preset second parameters, or the type of the second parameter corresponding to the data to be transmitted belongs to preset types of second parameters.

Updating the data corresponding to the second parameter can refer to adding new data or deleting data in the data corresponding to the second parameter.

The update of the data may be an update by a change in the corresponding relationships among the plurality of second parameters, which is described in detail below.

A priority threshold corresponding to the second parameter is set according to the embodiments of the present disclosure, and only the second parameter that meets a priority threshold requirement triggers the first BSR. The priority threshold may include a minimum threshold and/or a maximum threshold. The priority threshold is set based on identifications (or reference numerals) of the second parameter.

A preset priority range corresponding to the second parameter is set according to the embodiments of the present disclosure, and only the second parameter within the preset priority range triggers the first BSR. The preset priority range may include priorities defined in a second parameter list or a second parameter interval. The preset priority range is set based on identifications (or reference numerals) of the second parameter.

A priority threshold corresponding to the second parameter type is set according to the embodiments of the present disclosure, and only the second parameter type that meets a priority threshold requirement triggers the first BSR. The priority threshold may include a minimum threshold and/or a maximum threshold. The priority threshold is set based on identifications (or reference numerals) of the second parameter type.

A preset priority range corresponding to the second parameter type is set according to the embodiments of the present disclosure, and only the second parameter type within the preset priority range triggers the first BSR. The preset priority range may include priorities defined in a second parameter type list or a second parameter type interval. The preset priority range is set based on identifications (or reference numerals) of the second parameter type.

Mapping relationships among a plurality of second parameters may include a mapping relationship between any two second parameters. If the mapping relationship between any two second parameters is updated, the first BSR is triggered. Taking FIG. 2 as an example, the mapping relationship among the plurality of second parameters may include at least one of: a mapping relationship between a PDU set and a QoS stream, a mapping relationship between a QoS flow and a DRB, a mapping relationship between a DRB and a PDCP, or a mapping relationship between a PDCP and an RLC.

Preset second parameters can be set according to the embodiments of the present disclosure, and only the second parameter that belongs to the preset second parameters triggers the first BSR. The preset second parameters may include second parameters defined in a second parameter list or a second parameter interval. The preset second parameters are set based on identifications (or reference numerals) of the second parameter.

Preset second parameter types can be set according to the embodiments of the present disclosure, and only the second parameter type that belongs to the preset second parameter types triggers the first BSR. The preset second parameter types may include second parameter types defined in a second parameter type list or a second parameter type interval. The preset second parameter types are set based on identifications (or reference numerals) of the second parameter types.

In some embodiments, the triggering condition of the first BSR may include at least one of: a priority of the second parameter corresponding to updated data is higher than a first priority threshold, the priority of the second parameter corresponding to the updated data is within a first priority range, the priority of the second parameter corresponding to the updated data is higher than a priority of the second parameter corresponding to the data to be transmitted in the terminal device, the second parameter corresponding to the updated data belongs to preset second parameters, a priority of a type of the second parameter corresponding to the updated data is higher than a second priority threshold, the priority of the type of the second parameter corresponding to the updated data is within a second priority range, the priority of the type of the second parameter corresponding to the updated data is higher than a priority of a type of the second parameter corresponding to the data to be transmitted in the terminal device, the type of the second parameter corresponding to the updated data belongs to preset types of second parameters, the remaining transmission duration of the data to be transmitted corresponding to the second parameter is less than a third duration threshold, or added new data is not deleted.

The triggering condition of the first BSR is described below with several examples.

(1) Adding New Data to the Data Corresponding to the PDU Set

If new data is added to the PDU set, the first BSR can be triggered. In some embodiments, the first BSR can only be triggered if new data is added to a specific PDU set. The specific PDU set may be indicated by the network device.

The specific PDU set can be determined based on at least one of: a PDU set list, a PDU set type list, a priority of a PDU set, or a priority of a PDU set type.

Taking the specific PDU set being determined based on the PDU set list as an example, in a case that the PDU set added with new data belongs to the PDU set in the PDU set list, the first BSR is triggered.

Taking the specific PDU set being determined based on the PDU set type list as an example, in a case that the PDU set type with the added new data belongs to the PDU set type in the PDU set type list, the first BSR is triggered.

Taking the specific PDU set being determined based on the priority of the PDU set as an example, the priority of the PDU set may include an upper priority limit and/or a lower priority limit. If the priority of the PDU set includes the lower priority limit, the first BSR is triggered in a case that the priority of the PDU set with the added new data is higher than the lower priority limit. If the priority of the PDU set includes the upper priority limit, the first BSR is triggered in a case that the priority of the PDU set with the added new data is lower than the upper priority limit. If the priority of the PDU set includes the lower priority limit and the upper priority limit, the first BSR is triggered in a case that the priority of the PDU set with the added new data is higher than the lower priority limit and lower than the upper priority limit.

Taking the specific PDU set being determined based on the priority of the PDU set type as an example, the priority of the PDU set type may include an upper priority limit and/or a lower priority limit. If the priority of the PDU set type includes the lower priority limit, the first BSR is triggered in a case that the priority of the PDU set type with the added new data is higher than the lower priority limit. If the priority of the PDU set type includes the upper priority limit, the first BSR is triggered in a case that the priority of the PDU set type with the added new data is lower than the upper priority limit. If the priority of the PDU set type includes the lower priority limit and the upper priority limit, the first BSR is triggered in a case that the priority of the PDU set type with the added new data is higher than the lower priority limit and lower than the upper priority limit.

In some embodiments, the triggering condition of the first BSR may include that the priority of the PDU set with the added new data is higher than a priority of the PDU set with the data to be transmitted in the terminal device. For example, assuming that the PDU set with the added new data is a PDU set 1 and the PDU sets of data to be transmitted in the terminal device include a PDU set 2 and a PDU set 3, the first BSR is triggered if the priority of the PDU set 1 is higher than the priority of the PDU set 2 and the priority of the PDU set 3, and the first BSR is not triggered if the priority of the PDU set 1 is lower than the priority of the PDU set 2 and/or the priority of the PDU set 3.

The priority of the PDU set and/or the priority of the PDU set type in the embodiments of the present disclosure can be configured by the base station.

(2) Adding New Data to the Data Corresponding to the QoS Stream

If new data is added to the QoS stream, the first BSR can be triggered. In some embodiments, the first BSR can only be triggered if new data is added to a specific QoS stream. The specific QoS stream may be indicated by the network device.

The specific QoS stream can be determined based on at least one of: a QoS stream list, a QoS stream type list, a priority of a QoS stream, or a priority of a QoS stream type.

Taking the specific QoS stream being determined based on the QoS stream list as an example, in a case that the QoS stream with the added new data belongs to the QoS stream in the QoS stream list, the first BSR is triggered.

Taking the specific QoS stream being determined based on the QoS stream type list as an example, in a case that the QoS stream type with the added new data belongs to the QoS stream type in the QoS stream type list, the first BSR is triggered.

Taking the specific QoS stream being determined based on the priority of the QoS stream as an example, the priority of the QoS stream may include an upper priority limit and/or a lower priority limit. If the priority of the QoS stream includes the lower priority limit, the first BSR is triggered in a case that the priority of the QoS stream with the added new data is higher than the lower priority limit. If the priority of the QoS stream includes the upper priority limit, the first BSR is triggered in a case that the priority of the QoS stream with the added new data is lower than the upper priority limit. If the priority of the QoS stream includes the lower priority limit and the upper priority limit, the first BSR is triggered in a case that the priority of the QoS stream with the added new data is higher than the lower priority limit and lower than the upper priority limit.

Taking the specific QoS stream being determined based on the priority of the QoS stream type as an example, the priority of the QoS stream type may include an upper priority limit and/or a lower priority limit. If the priority of the QoS stream type includes the lower priority limit, the first BSR is triggered in a case that the priority of the QoS stream type with the added new data is higher than the lower priority limit. If the priority of the QoS stream type includes the upper priority limit, the first BSR is triggered in a case that the priority of the QoS stream type with the added new data is lower than the upper priority limit. If the priority of the QoS stream type includes the lower priority limit and the upper priority limit, the first BSR is triggered in a case that the priority of the QoS stream type with the added new data is higher than the lower priority limit and lower than the upper priority limit.

In some embodiments, the triggering condition of the first BSR may include that the priority of the QoS stream with the added new data is higher than a priority of the QoS stream with the data to be transmitted in the terminal device. For example, assuming that the QoS stream with the added new data is a QoS stream 1 and the QoS streams of data to be transmitted in the terminal device include a QoS stream 2 and a QoS stream 3, the first BSR is triggered if the priority of the QoS stream 1 is higher than the priority of the QoS stream 2 and the priority of the QoS stream 3, and the first BSR is not triggered if the priority of the QoS stream 1 is lower than the priority of the QoS stream 2 and/or the priority of the QoS stream 3.

The priority of the QoS stream and/or the priority of the QoS stream type in the embodiments of the present disclosure can be configured by the base station.

(3) Adding New Data to the Data Corresponding to the DRB

If new data is added to the DRB, the first BSR can be triggered. In some embodiments, the first BSR can only be triggered if new data is added to a specific DRB. The specific DRB may be indicated by the network device.

The specific DRB can be determined based on at least one of: a DRB list, a DRB type list, a priority of a DRB, or a priority of a DRB type.

Taking the specific DRB being determined based on the DRB list as an example, in a case that the DRB with the added new data belongs to the DRB in the DRB list, the first BSR is triggered.

Taking the specific DRB being determined based on the DRB type list as an example, in a case that the DRB type with the added new data belongs to the DRB type in the DRB type list, the first BSR is triggered.

Taking the specific DRB being determined based on the priority of the DRB as an example, the priority of the DRB may include an upper priority limit and/or a lower priority limit. If the priority of the DRB includes the lower priority limit, the first BSR is triggered in a case that the priority of the DRB with the added new data is higher than the lower priority limit. If the priority of the DRB includes the upper priority limit, the first BSR is triggered in a case that the priority of the DRB with the added new data is lower than the upper priority limit. If the priority of the DRB includes the lower priority limit and the upper priority limit, the first BSR is triggered in a case that the priority of the DRB with the added new data is higher than the lower priority limit and lower than the upper priority limit.

Taking the specific DRB being determined based on the priority of the DRB type as an example, the priority of the DRB type may include an upper priority limit and/or a lower priority limit. If the priority of the DRB type includes the lower priority limit, the first BSR is triggered in a case that the priority of the DRB type with the added new data is higher than the lower priority limit. If the priority of the DRB type includes the upper priority limit, the first BSR is triggered in a case that the priority of the DRB type with the added new data is lower than the upper priority limit. If the priority of the DRB type includes the lower priority limit and the upper priority limit, the first BSR is triggered in a case that the priority of the DRB type with the added new data is higher than the lower priority limit and lower than the upper priority limit.

In some embodiments, the triggering condition of the first BSR may include that the priority of the DRB with the added new data is higher than a priority of the DRB with the data to be transmitted in the terminal device. For example, assuming that the DRB with the added new data is a DRB 1 and the DRBs of data to be transmitted in the terminal device include a DRB 2 and a DRB 3, the first BSR is triggered if the priority of the DRB 1 is higher than the priority of the DRB 2 and the priority of the DRB 3, and the first BSR is not triggered if the priority of the DRB 1 is lower than the priority of the DRB 2 and/or the priority of the DRB 3.

The priority of the DRB and/or the priority of the DRB type in the embodiments of the present disclosure can be configured by the base station.

(4) Adding New Data to the Data Corresponding to the PDCP

If new data is added to the PDCP, the first BSR can be triggered. In some embodiments, the first BSR can only be triggered if new data is added to a specific PDCP. The specific PDCP may be indicated by the network device.

The specific PDCP can be determined based on at least one of: a PDCP list, a PDCP type list, a priority of a PDCP, or a priority of a PDCP type.

Taking the specific PDCP being determined based on the PDCP list as an example, in a case that the PDCP with the added new data belongs to the PDCP in the PDCP list, the first BSR is triggered.

Taking the specific PDCP being determined based on the PDCP type list as an example, in a case that the PDCP type with the added new data belongs to the PDCP type in the PDCP type list, the first BSR is triggered.

Taking the specific PDCP being determined based on the priority of the PDCP as an example, the priority of the PDCP may include an upper priority limit and/or a lower priority limit. If the priority of the PDCP includes the lower priority limit, the first BSR is triggered in a case that the priority of the PDCP with the added new data is higher than the lower priority limit. If the priority of the PDCP includes the upper priority limit, the first BSR is triggered in a case that the priority of the PDCP with the added new data is lower than the upper priority limit. If the priority of the PDCP includes the lower priority limit and the upper priority limit, the first BSR is triggered in a case that the priority of the PDCP with the added new data is higher than the lower priority limit and lower than the upper priority limit.

Taking the specific PDCP being determined based on the priority of the PDCP type as an example, the priority of the PDCP type may include an upper priority limit and/or a lower priority limit. If the priority of the PDCP type includes the lower priority limit, the first BSR is triggered in a case that the priority of the PDCP type with the added new data is higher than the lower priority limit. If the priority of the PDCP type includes the upper priority limit, the first BSR is triggered in a case that the priority of the PDCP type with the added new data is lower than the upper priority limit. If the priority of the PDCP type includes the lower priority limit and the upper priority limit, the first BSR is triggered in a case that the priority of the PDCP type with the added new data is higher than the lower priority limit and lower than the upper priority limit.

In some embodiments, the triggering condition of the first BSR may include that the priority of the PDCP with the added new data is higher than a priority of the PDCP with the data to be transmitted in the terminal device. For example, assuming that the PDCP with the added new data is a PDCP 1 and the PDCPs of data to be transmitted in the terminal device include a PDCP 2 and a PDCP 3, the first BSR is triggered if the priority of PDCP 1 is higher than the priority of the PDCP 2 and the priority of the PDCP 3, and the first BSR is not triggered if the priority of the PDCP 1 is lower than the priority of the PDCP 2 and/or the priority of the PDCP 3.

The priority of the PDCP and/or the priority of the PDCP type in the embodiments of the present disclosure can be configured by the base station.

(5) Adding New Data to the Data Corresponding to the RLC

If new data is added to the RLC, the first BSR can be triggered. In some embodiments, the first BSR can only be triggered if new data is added to a specific RLC. The specific RLC may be indicated by the network device.

The specific RLC can be determined based on at least one of: an RLC list, an RLC type list, a priority of an RLC, or a priority of an RLC type.

Taking the specific RLC being determined based on the RLC list as an example, in a case that the RLC with the added new data belongs to the RLC in the RLC list, the first BSR is triggered.

Taking the specific RLC being determined based on the RLC type list as an example, in a case that the RLC type with the added new data belongs to the RLC type in the RLC type list, the first BSR is triggered.

Taking the specific RLC being determined based on the priority of the RLC as an example, the priority of the RLC may include an upper priority limit and/or a lower priority limit. If the priority of the RLC includes the lower priority limit, the first BSR is triggered in a case that the priority of the RLC with the added new data is higher than the lower priority limit. If the priority of the RLC includes the upper priority limit, the first BSR is triggered in a case that the priority of the RLC with the added new data is lower than the upper priority limit. If the priority of the RLC includes the lower priority limit and the upper priority limit, the first BSR is triggered in a case that the priority of the RLC with the added new data is higher than the lower priority limit and lower than the upper priority limit.

Taking the specific RLC being determined based on the priority of the RLC type as an example, the priority of the RLC type may include an upper priority limit and/or a lower priority limit. If the priority of the RLC type includes the lower priority limit, the first BSR is triggered in a case that the priority of the RLC type with the added new data is higher than the lower priority limit. If the priority of the RLC type includes the upper priority limit, the first BSR is triggered in a case that the priority of the RLC type with the added new data is lower than the upper priority limit. If the priority of the RLC type includes the lower priority limit and the upper priority limit, the first BSR is triggered in a case that the priority of the RLC type with the added new data is higher than the lower priority limit and lower than the upper priority limit.

In some embodiments, the triggering condition of the first BSR may include that the priority of the RLC with the added new data is higher than a priority of the RLC with the data to be transmitted in the terminal device. For example, assuming that the RLC with the added new data is an RLC 1 and the RLCs of data to be transmitted in the terminal device include an RLC 2 and an RLC 3, the first BSR is triggered if the priority of the RLC 1 is higher than the priority of the RLC 2 and the priority of the RLC 3, and the first BSR is not triggered if the priority of the RLC 1 is lower than the priority of the RLC 2 and/or the priority of the RLC 3.

The priority of the RLC and/or the priority of the RLC type in the embodiments of the present disclosure can be configured by the base station.

(6) Adding New Data to the Data Corresponding to the Logical Channel

If new data is added to the logical channel, the first BSR can be triggered. In some embodiments, the first BSR can only be triggered if new data is added to a specific logical channel. The specific logical channel may be indicated by the network device.

The specific logical channel can be determined based on at least one of: a logical channel list, a logical channel type list, a priority of a logical channel, or a priority of a logical channel type.

Taking the specific logical channel being determined based on the logical channel list as an example, in a case that the logical channel with the added new data belongs to the logical channel in the logical channel list, the first BSR is triggered.

Taking the specific logical channel being determined based on the logical channel type list as an example, in a case that the logical channel type with the added new data belongs to the logical channel type in the logical channel type list, the first BSR is triggered.

Taking the specific logical channel being determined based on the priority of the logical channel as an example, the priority of the logical channel may include an upper priority limit and/or a lower priority limit. If the priority of the logical channel includes the lower priority limit, the first BSR is triggered in a case that the priority of the logical channel with the added new data is higher than the lower priority limit. If the priority of the logical channel includes the upper priority limit, the first BSR is triggered in a case that the priority of the logical channel with the added new data is lower than the upper priority limit. If the priority of the logical channel includes the lower priority limit and the upper priority limit, the first BSR is triggered in a case that the priority of the logical channel with the added new data is higher than the lower priority limit and lower than the upper priority limit.

Taking the specific logical channel being determined based on the priority of the logical channel type as an example, the priority of the logical channel type may include an upper priority limit and/or a lower priority limit. If the priority of the logical channel type includes the lower priority limit, the first BSR is triggered in a case that the priority of the logical channel type with the added new data is higher than the lower priority limit. If the priority of the logical channel type includes the upper priority limit, the first BSR is triggered in a case that the priority of the logical channel type with the added new data is lower than the upper priority limit. If the priority of the logical channel type includes the lower priority limit and the upper priority limit, the first BSR is triggered in a case that the priority of the logical channel type with the added new data is higher than the lower priority limit and lower than the upper priority limit.

In some embodiments, the triggering condition of the first BSR may include that the priority of the logical channel with the added new data is higher than a priority of the logical channel with the data to be transmitted in the terminal device. For example, assuming that the logical channel with the added new data is a LCH 1 and the logical channels of the data to be transmitted in the terminal device include a LCH 2 and a LCH 3, the first BSR is triggered if the priority of the LCH 1 is higher than the priority of the LCH 2 and the priority of the LCH 3, and the first BSR is not triggered if the priority of the LCH 1 is lower than the priority of the LCH 2 and/or the priority of the LCH 3.

The priority of the logical channel and/or the priority of the logical channel type in the embodiments of the present disclosure can be configured by the base station.

(7) Adding New Data to the Data Corresponding to the Logical Channel Group

If new data is added to the logical channel group, the first BSR can be triggered. In some embodiments, the first BSR can only be triggered if new data is added to a specific logical channel group. The specific logical channel group may be indicated by the network device.

The specific logical channel group can be determined based on at least one of: a logical channel group list, a logical channel group type list, a priority of a logical channel group, or a priority of a logical channel group type.

Taking the specific logical channel group being determined based on the logical channel group list as an example, in a case that the logical channel group with the added new data belongs to the logical channel group in the logical channel group list, the first BSR is triggered.

Taking the specific logical channel group being determined based on the logical channel group type list as an example, in a case that the logical channel group type with the added new data belongs to the logical channel group type in the logical channel group type list, the first BSR is triggered.

Taking the specific logical channel group being determined based on the priority of the logical channel group as an example, the priority of the logical channel group may include an upper priority limit and/or a lower priority limit. If the priority of the logical channel group includes the lower priority limit, the first BSR is triggered in a case that the priority of the logical channel group with the added new data is higher than the lower priority limit. If the priority of the logical channel group includes the upper priority limit, the first BSR is triggered in a case that the priority of the logical channel group with the added new data is lower than the upper priority limit. If the priority of the logical channel group includes the lower priority limit and the upper priority limit, the first BSR is triggered in a case that the priority of the logical channel group with the added new data is higher than the lower priority limit and lower than the upper priority limit.

Taking the specific logical channel group being determined based on the priority of the logical channel group type as an example, the priority of the logical channel group type may include an upper priority limit and/or a lower priority limit. If the priority of the logical channel group type includes the lower priority limit, the first BSR is triggered in a case that the priority of the logical channel group type with the added new data is higher than the lower priority limit. If the priority of the logical channel group type includes the upper priority limit, the first BSR is triggered in a case that the priority of the logical channel group type with the added new data is lower than the upper priority limit. If the priority of the logical channel group type includes the lower priority limit and the upper priority limit, the first BSR is triggered in a case that the priority of the logical channel group type with the added new data is higher than the lower priority limit and lower than the upper priority limit.

In some embodiments, the triggering condition of the first BSR may include that the priority of the logical channel group with the added new data is higher than a priority of the logical channel group with the data to be transmitted in the terminal device. For example, assuming that the logical channel group with the added new data is a LCG 1 and the logical channel groups of the data to be transmitted in the terminal device include a LCG 2 and a LCG 3, the first BSR is triggered if the priority of the LCG 1 is higher than the priority of the LCG 2 and the priority of the LCG 3, and the first BSR is not triggered if the priority of the LCG 1 is lower than the priority of the LCG 2 and/or the priority of the LCG 3.

The priority of the logical channel group and/or the priority of the logical channel group type in the embodiments of the present disclosure can be configured by the base station.

When the terminal device deletes the portion of data that meets the condition, the first BSR can be triggered. The deletion here includes but is not limited to the following cases: since the remaining transmission duration has been arrived, the data is useless even if it is transmitted to the receiver. The plurality of sets of data (such as a plurality of PDUs) in the PDU set are indispensable, but a portion of data in the PDU set has failed to be transmitted, so the transmission of the remaining data in the PDU set is abandoned. Data is about to be invalid, such as the remaining transmission duration of the data is about to be arrived, but there are still a lot of data waiting to be transmitted in front of it, and the transmission of current data is hopeless. The terminal device deletes data for other reasons.

After the deleted data is determined, the terminal device can further determine whether the deleted data meets the conditions for triggering the BSR. The conditions for triggering BSR are described below.

(8) Deleting Data from the Data Corresponding to the PDU Set

If data is deleted from the PDU set, the first BSR can be triggered. In some embodiments, the first BSR can only be triggered if data is deleted from a specific PDU set. The specific PDU set may be indicated by a network device.

The specific PDU set can be determined based on at least one of: a PDU set list, a PDU set type list, a priority of a PDU set, or a priority of a PDU set type.

Taking the specific PDU set being determined based on the PDU set list as an example, in a case that the PDU set with the deleted data belongs to the PDU set in the PDU set list, the first BSR is triggered.

Taking the specific PDU set being determined based on the PDU set type list as an example, in a case that the PDU set type with the deleted data belongs to the PDU set type in the PDU set type list, the first BSR is triggered.

Taking the specific PDU set being determined based on the priority of the PDU set as an example, the priority of the PDU set may include an upper priority limit and/or a lower priority limit. If the priority of the PDU set includes the lower priority limit, the first BSR is triggered in a case that the priority of the PDU set with the deleted data is higher than the lower priority limit. If the priority of the PDU set includes the upper priority limit, the first BSR is triggered in a case that the priority of the PDU set with the deleted data is lower than the upper priority limit. If the priority of the PDU set includes the lower priority limit and the upper priority limit, the first BSR is triggered in a case that the priority of the PDU set with the deleted data is higher than the lower priority limit and lower than the upper priority limit.

Taking the specific PDU set being determined based on the priority of the PDU set type as an example, the priority of the PDU set type may include an upper priority limit and/or a lower priority limit. If the priority of the PDU set type includes the lower priority limit, the first BSR is triggered in a case that the priority of the PDU set type with the deleted data is higher than the lower priority limit. If the priority of the PDU set type includes the upper priority limit, the first BSR is triggered in a case that the priority of the PDU set type with the deleted data is lower than the upper priority limit. If the priority of the PDU set type includes the lower priority limit and the upper priority limit, the first BSR is triggered in a case that the priority of the PDU set type with the deleted data is higher than the lower priority limit and lower than the upper priority limit.

The priority of the PDU set and/or the priority of the PDU set type in the embodiments of the present disclosure can be configured by the base station.

(9) Deleting Data from the Data Corresponding to the QoS Stream

If data is deleted from the QoS stream, the first BSR can be triggered. In some embodiments, the first BSR can only be triggered if data is deleted from a specific QoS stream. The specific QoS stream may be indicated by the network device.

The specific QoS stream can be determined based on at least one of: a QoS stream list, a QoS stream type list, a priority of a QoS stream, or a priority of a QoS stream type.

Taking the specific QoS stream being determined based on the QoS stream list as an example, in a case that the QoS stream with the deleted data belongs to the QoS stream in the QoS stream list, the first BSR is triggered.

Taking the specific QoS stream being determined based on the QoS stream type list as an example, in a case that the QoS stream type with the deleted data belongs to the QoS stream type in the QoS stream type list, the first BSR is triggered.

Taking the specific QoS stream being determined based on the priority of the QoS stream as an example, the priority of the QoS stream may include an upper priority limit and/or a lower priority limit. If the priority of the QoS stream includes the lower priority limit, the first BSR is triggered in a case that the priority of the QoS stream with the deleted data is higher than the lower priority limit. If the priority of the QoS stream includes the upper priority limit, the first BSR is triggered in a case that the priority of the QoS stream with the deleted data is lower than the upper priority limit. If the priority of the QoS stream includes the lower priority limit and the upper priority limit, the first BSR is triggered in a case that the priority of the QoS stream with the deleted data is higher than the lower priority limit and lower than the upper priority limit.

Taking the specific QoS stream being determined based on the priority of the QoS stream type as an example, the priority of the QoS stream type may include an upper priority limit and/or a lower priority limit. If the priority of the QoS stream type includes the lower priority limit, the first BSR is triggered in a case that the priority of the QoS stream type with the deleted data is higher than the lower priority limit. If the priority of the QoS stream type includes the upper priority limit, the first BSR is triggered in a case that the priority of the QoS stream type with the deleted data is lower than the upper priority limit. If the priority of the QoS stream type includes the lower priority limit and the upper priority limit, the first BSR is triggered in a case that the priority of the QoS stream type with the deleted data is higher than the lower priority limit and lower than the upper priority limit.

The priority of the QoS stream and/or the priority of the QoS stream type in the embodiments of the present disclosure can be configured by the base station.

(10) Deleting Data from the Data Corresponding to the DRB

If data is deleted from the DRB, the first BSR can be triggered. In some embodiments, the first BSR can only be triggered if data is deleted from a specific DRB. The specific DRB may be indicated by the network device.

The specific DRB can be determined based on at least one of: a DRB list, a DRB type list, a priority of a DRB, or a priority of a DRB type.

Taking the specific DRB being determined based on the DRB list as an example, in a case that the DRB with the deleted data belongs to the DRB in the DRB list, the first BSR is triggered.

Taking the specific DRB being determined based on the DRB type list as an example, in a case that the DRB type with the deleted data belongs to the DRB type in the DRB type list, the first BSR is triggered.

Taking the specific DRB being determined based on the priority of the DRB as an example, the priority of the DRB may include an upper priority limit and/or a lower priority limit. If the priority of the DRB includes the lower priority limit, the first BSR is triggered in a case that the priority of the DRB with the deleted data is higher than the lower priority limit. If the priority of the DRB includes the upper priority limit, the first BSR is triggered in a case that the priority of the DRB with the deleted data is lower than the upper priority limit. If the priority of the DRB includes the lower priority limit and the upper priority limit, the first BSR is triggered in a case that the priority of the DRB with the deleted data is higher than the lower priority limit and lower than the upper priority limit.

Taking the specific DRB being determined based on the priority of the DRB type as an example, the priority of the DRB type may include an upper priority limit and/or a lower priority limit. If the priority of the DRB type includes the lower priority limit, the first BSR is triggered in a case that the priority of the DRB type with the deleted data is higher than the lower priority limit. If the priority of the DRB type includes the upper priority limit, the first BSR is triggered in a case that the priority of the DRB type with the deleted data is lower than the upper priority limit. If the priority of the DRB type includes the lower priority limit and the upper priority limit, the first BSR is triggered in a case that the priority of the DRB type with the deleted data is higher than the lower priority limit and lower than the upper priority limit.

The priority of the DRB and/or the priority of the DRB type in the embodiments of the present disclosure can be configured by the base station.

(11) Deleting Data from the Data Corresponding to the PDCP

If data is deleted from the PDCP, the first BSR can be triggered. In some embodiments, the first BSR can only be triggered if data is deleted from a specific PDCP. The specific PDCP may be indicated by the network device.

The specific PDCP can be determined based on at least one of: a PDCP list, a PDCP type list, a priority of a PDCP, or a priority of a PDCP type.

Taking the specific PDCP being determined based on the PDCP list as an example, in a case that the PDCP with the deleted data belongs to the PDCP in the PDCP list, the first BSR is triggered.

Taking the specific PDCP being determined based on the PDCP type list as an example, in a case that the PDCP type with the deleted data belongs to the PDCP type in the PDCP type list, the first BSR is triggered.

Taking the specific PDCP being determined based on the priority of the PDCP as an example, the priority of the PDCP may include an upper priority limit and/or a lower priority limit. If the priority of the PDCP includes the lower priority limit, the first BSR is triggered in a case that the priority of the PDCP with the deleted data is higher than the lower priority limit. If the priority of the PDCP includes the upper priority limit, the first BSR is triggered in a case that the priority of the PDCP with the deleted data is lower than the upper priority limit. If the priority of the PDCP includes the lower priority limit and the upper priority limit, the first BSR is triggered in a case that the priority of the PDCP with the deleted data is higher than the lower priority limit and lower than the upper priority limit.

Taking the specific PDCP being determined based on the priority of the PDCP type as an example, the priority of the PDCP type may include an upper priority limit and/or a lower priority limit. If the priority of the PDCP type includes the lower priority limit, the first BSR is triggered in a case that the priority of the PDCP type with the deleted data is higher than the lower priority limit. If the priority of the PDCP type includes the upper priority limit, the first BSR is triggered in a case that the priority of the PDCP type with the deleted data is lower than the upper priority limit. If the priority of the PDCP type includes the lower priority limit and the upper priority limit, the first BSR is triggered in a case that the priority of the PDCP type with the deleted data is higher than the lower priority limit and lower than the upper priority limit.

The priority of the PDCP and/or the priority of the PDCP type in the embodiments of the present disclosure can be configured by the base station.

(12) Deleting Data from the Data Corresponding to the RLC

If data is deleted from the RLC, the first BSR can be triggered. In some embodiments, the first BSR can only be triggered if data is deleted from a specific RLC. The specific RLC may be indicated by the network device.

The specific RLC can be determined based on at least one of: an RLC list, an RLC type list, a priority of an RLC, or a priority of an RLC type.

Taking the specific RLC being determined based on the RLC list as an example, in a case that the RLC with the deleted data belongs to the RLC in the RLC list, the first BSR is triggered.

Taking the specific RLC being determined based on the RLC type list as an example, in a case that the RLC type with the deleted data belongs to the RLC type in the RLC type list, the first BSR is triggered.

Taking the specific RLC being determined based on the priority of the RLC as an example, the priority of the RLC may include an upper priority limit and/or a lower priority limit. If the priority of the RLC includes the lower priority limit, the first BSR is triggered in a case that the priority of the RLC with the deleted data is higher than the lower priority limit. If the priority of the RLC includes the upper priority limit, the first BSR is triggered in a case that the priority of the RLC with the deleted data is lower than the upper priority limit. If the priority of the RLC includes the lower priority limit and the upper priority limit, the first BSR is triggered in a case that the priority of the RLC with the deleted data is higher than the lower priority limit and lower than the upper priority limit.

Taking the specific RLC being determined based on the priority of the RLC type as an example, the priority of the RLC type may include an upper priority limit and/or a lower priority limit. If the priority of the RLC type includes the lower priority limit, the first BSR is triggered in a case that the priority of the RLC type with the deleted data is higher than the lower priority limit. If the priority of the RLC type includes the upper priority limit, the first BSR is triggered in a case that the priority of the RLC type with the deleted data is lower than the upper priority limit. If the priority of the RLC type includes the lower priority limit and the upper priority limit, the first BSR is triggered in a case that the priority of the RLC type with the deleted data is higher than the lower priority limit and lower than the upper priority limit.

The priority of the RLC and/or the priority of the RLC type in the embodiments of the present disclosure can be configured by the base station.

(13) Deleting Data from the Data Corresponding to the Logical Channel

If data is deleted from the logical channel, the first BSR can be triggered. In some embodiments, the first BSR can only be triggered if data is deleted from a specific logical channel. The specific logical channel may be indicated by the network device.

The specific logical channel can be determined based on at least one of: a logical channel list, a logical channel type list, a priority of a logical channel, or a priority of a logical channel type.

Taking the specific logical channel being determined based on the logical channel list as an example, in a case that the logical channel with the deleted data belongs to the logical channel in the logical channel list, the first BSR is triggered.

Taking the specific logical channel being determined based on the logical channel type list as an example, in a case that the logical channel type with the deleted data belongs to the logical channel type in the logical channel type list, the first BSR is triggered.

Taking the specific logical channel being determined based on the priority of the logical channel as an example, the priority of the logical channel may include an upper priority limit and/or a lower priority limit. If the priority of the logical channel includes the lower priority limit, the first BSR is triggered in a case that the priority of the logical channel with the deleted data is higher than the lower priority limit. If the priority of the logical channel includes the upper priority limit, the first BSR is triggered in a case that the priority of the logical channel with the deleted data is lower than the upper priority limit. If the priority of the logical channel includes the lower priority limit and the upper priority limit, the first BSR is triggered in a case that the priority of the logical channel with the deleted data is higher than the lower priority limit and lower than the upper priority limit.

Taking the specific logical channel being determined based on the priority of the logical channel type as an example, the priority of the logical channel type may include an upper priority limit and/or a lower priority limit. If the priority of the logical channel type includes the lower priority limit, the first BSR is triggered in a case that the priority of the logical channel type with the deleted data is higher than the lower priority limit. If the priority of the logical channel type includes the upper priority limit, the first BSR is triggered in a case that the priority of the logical channel type with the deleted data is lower than the upper priority limit. If the priority of the logical channel type includes the lower priority limit and the upper priority limit, the first BSR is triggered in a case that the priority of the logical channel type with the deleted data is higher than the lower priority limit and lower than the upper priority limit.

The priority of the logical channel and/or the priority of the logical channel type in the embodiments of the present disclosure can be configured by the base station.

(14) Deleting Data from the Data Corresponding to the Logical Channel Group

If data is deleted from the logical channel group, the first BSR can be triggered. In some embodiments, the first BSR can only be triggered if data is deleted from a specific logical channel group. The specific logical channel group may be indicated by the network device.

The specific logical channel group can be determined based on at least one of: a logical channel group list, a logical channel group type list, a priority of a logical channel group, or a priority of a logical channel group type.

Taking the specific logical channel group being determined based on the logical channel group list as an example, in a case that the logical channel group with the deleted data belongs to the logical channel group in the logical channel group list, the first BSR is triggered.

Taking the specific logical channel group being determined based on the logical channel group type list as an example, in a case that the logical channel group type with the deleted data belongs to the logical channel group type in the logical channel group type list, the first BSR is triggered.

Taking the specific logical channel group being determined based on the priority of the logical channel group as an example, the priority of the logical channel group may include an upper priority limit and/or a lower priority limit. If the priority of the logical channel group includes the lower priority limit, the first BSR is triggered in a case that the priority of the logical channel group with the deleted data is higher than the lower priority limit. If the priority of the logical channel group includes the upper priority limit, the first BSR is triggered in a case that the priority of the logical channel group with the deleted data is lower than the upper priority limit. If the priority of the logical channel group includes the lower priority limit and the upper priority limit, the first BSR is triggered in a case that the priority of the logical channel group with the deleted data is higher than the lower priority limit and lower than the upper priority limit.

Taking the specific logical channel group being determined based on the priority of the logical channel group type as an example, the priority of the logical channel group type may include an upper priority limit and/or a lower priority limit. If the priority of the logical channel group type includes the lower priority limit, the first BSR is triggered in a case that the priority of the logical channel group type with the deleted data is higher than the lower priority limit. If the priority of the logical channel group type includes the upper priority limit, the first BSR is triggered in a case that the priority of the logical channel group type with the deleted data is lower than the upper priority limit. If the priority of the logical channel group type includes the lower priority limit and the upper priority limit, the first BSR is triggered in a case that the priority of the logical channel group type with the deleted data is higher than the lower priority limit and lower than the upper priority limit.

The priority of the logical channel group and/or the priority of the logical channel group type in the embodiments of the present disclosure can be configured by the base station.

The triggering conditions for adding new data and the triggering conditions for deleting data mentioned above can be configured in a coupled manner or independently, which is not specifically limited in embodiments of the present disclosure. Coupling configuration can refer to the triggering conditions for adding new data being the same as the triggering conditions for deleting data. For example, when new data is added or deleted from the second parameter that meets the first condition, the first BSR can be triggered.

(15) The Mapping Relationships Among the Plurality of the Second Parameters are Updated In a case that the mapping relationships among the plurality of second parameters are updated, the first BSR is triggered.

The mapping relationship among the plurality of second parameters may include a mapping relationship between any two second parameters. If the mapping relationship between any two second parameters is updated, the first BSR is triggered. Taking FIG. 2 as an example, the mapping relationship among the plurality of second parameters may include at least one of: a mapping relationship between a PDU sets and a QoS stream, a mapping relationship between a QoS stream and a DRB, a mapping relationship between a DRB and a PDCP, a mapping relationship between a PDCP and an RLC.

In some embodiments, in response to the mapping relationships among the plurality of second parameters being updated, the data (the data packet) is changed from one second parameter to another second parameter, thereby triggering the first BSR.

For example, due to the change of the mapping relationship, some data is changed from one PDU set to another PDU set, from one QoS stream to another QoS stream, from one DRB to another DRB, from one PDCP to another PDCP, from one RLC to another RLC, or from one LCH to another LCH, thereby triggering the first BSR.

It can be understood that the above changes in the entities to which the data belongs due to changes in the mapping relationships are equivalent to the adding new data and deleting data as mentioned above. The entity herein may refer to any one of: the PDU set, the QoS stream, the DRB, the PDCP, the RLC, the LCH, or the LCG described above. For example, if the data is changed from one PDU set to another PDU set, it is equivalent to data being deleted from the original PDU set and new data being added to the changed PDU set. The conditions of changing the mapping relationships for triggering the first BSR can be shared with the conditions corresponding to adding new data and/or deleting data, or may be configured separately.

In some embodiments, if the mapping relationship change but the data is not updated, such as data not being updated from one entity to another entity, the terminal device may not need to trigger the first BSR. For example, if there is no data to be transmitted in an entity, there will be no change of data after the mapping relationships change, so the first BSR is not triggered.

(16) The Remaining Transmission Duration of the Data to be Transmitted is Less than a Third Duration Threshold If the remaining transmission duration of the data to be transmitted is less than the third duration threshold, the first BSR is triggered. The data to be transmitted may be any set of the data to be transmitted in the terminal device, or may be the data to be transmitted corresponding to the second parameter. For example, the first BSR is triggered only when the remaining transmission duration corresponding to the specific second parameter is less than the third duration threshold.

The specific second parameter may be determined based on one or more of: a second parameter list, a second parameter type list, a priority of the second parameter, a priority of the second parameter type.

The specific second parameter may refer to at least one of" a specific PDU set, a specific QoS stream, a specific PDCP, a specific DRB, a specific RLC, a specific LCH, or a specific LCG. The method of determining the specific second parameter can be referred to the above description, which is not be repeated here for brevity.

The third duration threshold can be set separately for different second parameters. For example, taking the second parameter as a PDU set as an example, a corresponding third duration threshold can be set for each PDU set. Alternatively, in some embodiments, all PDU sets can also share a third duration threshold. For another example, taking the second parameter as a QoS stream as an example, a corresponding third duration threshold can be set for each QoS stream. Alternatively, in some embodiments, all QoS streams can also share a third duration threshold. For another example, taking the second parameter as PDCP as an example, a corresponding third duration threshold can be set for each PDCP. Alternatively, in some embodiments, all PDCPs can also share a third duration threshold. For another example, taking the second parameter as a DRB as an example, a corresponding third duration threshold can be set for each DRB. Alternatively, in some embodiments, all DRBs can also share a third duration threshold. For another example, taking the second parameter as an RLC as an example, a corresponding third duration threshold can be set for each RLC. Alternatively, in some embodiments, all RLC can also share a third duration threshold. For another example, taking the second parameter as a LCH as an example, a corresponding third duration threshold can be set for each LCH. Alternatively, in some embodiments, all LCHs can also share a third duration threshold. For another example, taking the second parameter as a LCG as an example, a corresponding third duration threshold can be set for each LCG. Alternatively, in some embodiments, all LCGs can also share a third duration threshold.

In some embodiments, the third duration threshold can also be set at the granularity of groups. For example, taking the second parameter as a PDU set as an example, the PDU set can be divided into a plurality of groups according to the embodiments of the present disclosure, and each group corresponds to a third duration threshold. For another example, taking the second parameter as a QoS stream as an example, the QoS stream can be divided into a plurality of groups according to the embodiments of the present disclosure, and each group corresponds to a third duration threshold. For another example, taking the second parameter as a PDCP as an example, the PDCP can be divided into a plurality of groups according to the embodiments of the present disclosure, and each group corresponds to a third duration threshold. For another example, taking the second parameter as a DRB as an example, the DRB can be divided into a plurality of groups according to the embodiments of the present disclosure, and each group corresponds to a third duration threshold. For another example, taking the second parameter as an RLC as an example, the RLC can be divided into a plurality of groups according to the embodiments of the present disclosure, and each group corresponds to a third duration threshold. For another example, taking the second parameter as an LCH as an example, the LCH can be divided into a plurality of groups according to the embodiments of the present disclosure, and each group corresponds to a third duration threshold. For another example, taking the second parameter as an LCG as an example, the LCG can be divided into a plurality of groups according to the embodiments of the present disclosure, and each group corresponds to a third duration threshold.

The third duration threshold may be predefined by the protocol or configured by the network device for the terminal device, which is not specifically limited in the embodiments of the present disclosure.

(17) Added New Data is not Deleted

If the terminal device triggers a BSR due to the arrival of some data, and the data that triggered the BSR is deleted by the terminal device before the network device allocates the uplink radio resources, the terminal device can cancel the triggering of the BSR. If the added new data is not deleted, the terminal device does not cancel the triggering of the BSR. The following is described with reference to FIG. 13.

Figure 13:
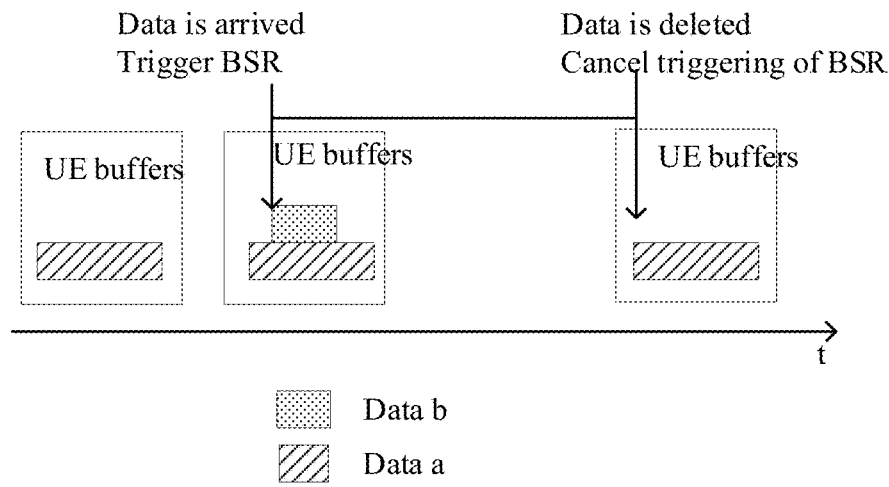
FIG. 13 is a schematic diagram for determining a triggering condition of a first BSR provided in some embodiments of the present disclosure.

As shown in FIG. 13, the terminal device originally caches data a. In response to the arrival of data b, the terminal device triggers the BSR. The remaining transmission duration of data b is relatively short, the terminal device can delete data b if no uplink radio resource is received within the remaining transmission duration. Since the previous BSR is triggered by the arrival of data b, the triggered BSR is canceled when data b is deleted.

In some embodiments, a plurality of triggering conditions of the first BSR are provided, and the terminal device maintains the triggering of a plurality of BSRs simultaneously. When the terminal device sends the BSR, the triggering of all BSRs is cancelled. The terminal device acquires the uplink wireless resource and transmits a transport block (TB). As long as there is still a triggering condition of the BSR, the terminal device transmits the BSR.

The way of triggering the first BSR described above can also be applied to triggering an old BSR. The old BSR is the BSR generated using Table 1.

IV. Generation Method of the BSR

The first BSR is generated based on corresponding relationships between intervals of the remaining transmission durations and a third parameter. The third parameter includes at least one of: a logical channel, a logical channel group, a DRB, a PDCP, an RLC, a QoS stream or a PDU set.

The data to be transmitted indicated by the first BSR includes a plurality of levels of data to be transmitted. The plurality of levels are determined based on the intervals of remaining transmission durations and the third parameter.

The network device can configure the levels of the remaining transmission durations for the terminal device, and each level corresponds to an interval of the remaining transmission duration. For example, the remaining transmission duration ranging from 0 ms to 5 ms has a level, the remaining transmission duration ranging from 5 ms to 10 ms has another level, and the remaining transmission duration ranging from 10 ms to 15 ms has another level, and so on.

In some embodiments, the network device can only indicate a duration step size of each level, or can completely indicate a starting remaining latency value and an ending remaining latency value of each level. The range of the remaining transmission duration corresponding to each level can be the same or different, which is not specifically limited in the embodiments of the present disclosure. For example, the level from 0 ms to 5 ms, the level from 5 ms to 10 ms and the level 10 ms to 15 ms belong to the levels of the remaining transmission durations with the same step size. For another example, the network device can also configure the levels of the remaining transmission durations with different step sizes. For example, the levels of the remaining transmission durations can include a level from 0 ms to 5 ms, a level from 5 ms to 12 ms and a level from 12 ms to 20 ms.

The intervals of the remaining transmission durations may include an open interval, or all the intervals of the remaining transmission durations are closed intervals, which is not specifically limited in the embodiments of the present disclosure. For example, if the remaining transmission duration being greater than 30 ms is a level, the terminal device can count all the data with the remaining transmission duration from 30 ms to infinity into the level of "greater than 30 ms" in the BSR.

The intervals of the remaining transmission durations can be configured by the network device to the terminal device, or it can be predefined in the protocol. If the intervals of the remaining transmission durations are configured by the network device, it can be configured by the network device through the RRC message or the MAC CE.

The third parameter includes at least one of: a logical channel, a logical channel group, a DRB, a PDCP, an RLC, a QoS stream or a PDU set. The number of third parameters included in each level can be equal or unequal. The third parameter included in each level can be configured by the network device for the terminal device, or can be predefined in the protocol.

Taking the PDU set as an example, if the levels are divided according to PDU sets, the first level can include a PDU set A, a PDU set B, the second level includes a PDU set C, a PDU set D, a PDU set E, and the third level includes a PDU set F, etc., as shown in Table 2.

TABLE 2

|  | PDU set A<br>PDU set B | PDU set C<br>PDU set D<br>PDU set E | PDU set F |
|---|---|---|---|
| remaining transmission duration 0-5 ms | a | b | c |
| remaining transmission duration 5-10 ms | d | e | f |
| remaining transmission duration 10-15 ms | g | h | i |

Taking the LCH as an example, if the levels are divided according to LCHs, the first level can include a LCH A, a LCH B, the second level includes a LCH C, a LCH D, a LCH E, and the third level includes a LCH F, etc., as shown in Table 3.

TABLE 3

|  | LCH A<br>LCH B | LCH C | LCH D<br>LCH E |
|---|---|---|---|
| remaining transmission duration 0-5 ms | a | b | c |
| remaining transmission duration 5-10 ms | d | e | f |
| remaining transmission duration 10-15 ms | g | h | i |

For the other third parameters, the setting method of levels is similar to that of PDU set and LCH, which is not repeated here for brevity.

Taking Table 3 as an example to introduce how the terminal device generates the first BSR.

The data volume to be transmitted indicated by the first BSR may include nine data volumes to be transmitted, which are a, b, c, d, e, f, g, h, and i. a represents the data volume to be transmitted with the remaining transmission duration ranging from 0 ms to 5 ms in LCH A and LCH B. b represents the data volume to be transmitted with the remaining transmission duration ranging from 0 ms to 5 ms in LCH C. c represents the data volume to be transmitted with the remaining transmission duration ranging from 0 ms to 5 ms in LCH D and LCH E. d represents the data volume to be transmitted with the remaining transmission duration ranging from 5 ms to 10 ms in LCH A and LCH B. e represents the data volume to be transmitted with the remaining transmission duration ranging from 5 ms to 10 ms in LCH C. f represents the data volume to be transmitted with the remaining transmission duration ranging from 5 ms to 10 ms in LCH D and LCH E. g represents the data volume to be transmitted with the remaining transmission duration ranging from 10 ms to 15 ms in LCH A and LCH B. h represents the data volume to be transmitted with the remaining transmission duration ranging from 10 ms to 15 ms in LCH C. i represents the data volume to be transmitted with the remaining transmission duration ranging from 10 ms to 15 ms in LCH D and LCH E.

In some embodiments, one of a plurality of corresponding relationships between the remaining transmission duration intervals and the third parameter is used by the terminal device to generate the first BSR. The corresponding relationship to be used specifically is indicated by the network device. Each corresponding relationship can correspond to an index, the network device can indicate an index value to the terminal device, and the terminal device can determine the corresponding relationship to be used according to the index value.

The Plurality of Corresponding Relationships can be Pre-Configured in the Protocol or Configured by the Network Device for the Terminal Device.

V. Sending the BSR

A priority (a scheduling priority) of the first BSR is set according to the embodiments of the present disclosure. In some embodiments, the priority of the first BSR is higher than a priority of a data channel, and/or, the priority of the first BSR is lower than a priority of a control channel.

The priority of the first BSR can be configured by the network device. For example, the network device can configure the relationship between the priority of the first BSR and the priority of the control channel (such as SRB).

In some embodiments, the first BSR has a dedicated logical channel identification (LCH ID). The logical channel identification is different from the logical channel identification of the original BSR. In other embodiments, the first BSR adopts the same logical channel identification as the original BSR.

In some embodiments, the first BSR is multiplexed with a specific type of the logical channel in one TB. For example, the first BSR can use the same logical channel identification as the original BSR, but the first BSR is only multiplexed with a specific type of the logical channel in one TB. The specific type of service can be, for example, an XR service. That is to say, the first BSR multiplexes one TB with the logical channel corresponding to the XR service, but not multiplexes with one TB with other logical channels.

In some embodiments, the first BSR may have dedicated transmission resources (or uplink radio resources). For example, the first BSR may use the same logical channel identification as the original BSR, but the first BSR is only transmitted through a dedicated transmission resource, and is not transmitted through other resources. The dedicated transmission resources can be, for example, an XR dedicated transmission resource or an XR BSR dedicated transmission resource.

The dedicated transmission resource can be determined through negotiation between the terminal device and the network device, or configured by the network device for the terminal device. For example, the network device can indicate a dedicated transmission resource to the terminal device through DCI or RRC. For example, the network device can indicate to the terminal device through DCI that a specific radio resource belongs to the uplink radio resource dedicated to XR (or the uplink radio resource dedicated to XR BSR), or the network device can indicate to the terminal device through RRC that a specific CG radio resource belongs to the uplink radio resource dedicated to XR (or the uplink radio resource dedicated to XR BSR).

In response to the first BSR being borne on a dedicated transmission resource, a media access control (MAC) sub-header corresponding to the first BSR does not bear a logical channel identification corresponding to the first BSR.

The MAC header corresponding to the first BSR may or may not include a length field. For example, if the first BSR has a certain length, the length field is be included in the MAC header corresponding to the first BSR. If the first BSR has an indefinite length, the length field is included in the MAC header corresponding to the first BSR.

Taking Table 3 as an example, if the terminal device generates the first BSR according to the BSR format shown in Table 3 and determines the length of the first BSR, then the length field is included in the MAC sub-header corresponding to the first BSR. If the values of a, b, c, d, e, f, g, h, and i are even 0, the corresponding fields still need to be padded with 0 to ensure that the first BSR has a certain length. If 0 padding is not used, the length field needs to be included in the MAC sub-header. Whether to use 0 padding can be specified by the protocol or configured by the network device.

In some embodiments, the first information is configured to indicate a resource not available for transmitting the first BSR. The resource not available for transmitting the first BSR can be a transmission resource dedicated to a specific service. For example, some uplink radio resources allocated by the network device to the terminal device for transmitting some types of service data may not be available for transmitting the first BSR.

The resources not available for transmitting the first BSR is indicated to the terminal device by the network device. For example, the network device can indicate the resource not available for transmitting the first BSR through the RRC message or DCI. The resource not available for transmitting the first BSR may be a CG resource or a DG resource.

For example, the network device can indicate to the terminal device through the RRC message which type 1 CG resource or type 2 CG resource is not available for transmitting the first BSR. For another example, the network device can indicate to the terminal device through DCI which DG resource is not available for transmitting the first BSR or which type 2 CG resources is not available for transmitting the BSR.

In some embodiments, the terminal device can further send a second BSR to the network device, and the second BSR is configured to indicate data volume of data to be transmitted. The second BSR can be the original BSR.

The first BSR is determined based on a first BSR table, and the second BSR is determined based on a second BSR table. The second BSR table can be the table shown in Table 1. The first BSR table has corresponding relationships among BSR code points and the data volume different from corresponding relationships among BSR code points and the data volume in the second BSR table. The first BSR is referred to as the new BSR and the second BSR is referred to as the old BSR.

In some embodiments, the triggering and transmission of the first BSR and the second BSR are independent. For example, when both the first BSR and the second BSR are in a triggered state, the second BSR remains in the triggered state if the first BSR is transmitted. Alternatively, the first BSR remains in the triggered state if the second BSR is transmitted.

In some embodiments, the triggering and transmission of the first BSR and the second BSR are coupled. For example, the data to be transmitted corresponding to the second BSR may include the data to be transmitted corresponding to the first BSR. In the case that the terminal device has sent the second BSR, the terminal device can cancel the sending of the first BSR.

For example, the second BSR can report the data volume that should be reported by the first BSR, but the first BSR will not report the data volume that should be reported by the second BSR. When both the first BSR and the second BSR are in the triggered state, the triggering of the second BSR is not cancelled if the terminal device sends the first BSR, the triggering of the first BSR is cancelled if the terminal device sends the second BSR.

Whether the first BSR and the second BSR are coupled can be configured by the network device.

Figure 14:
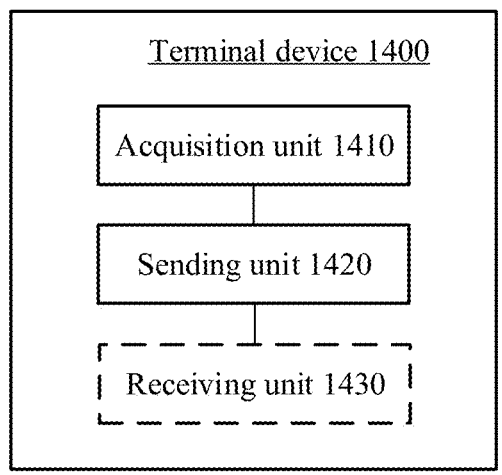
FIG. 14 is a schematic diagram of a terminal device provided in some embodiments of the present disclosure.
Figure 15:
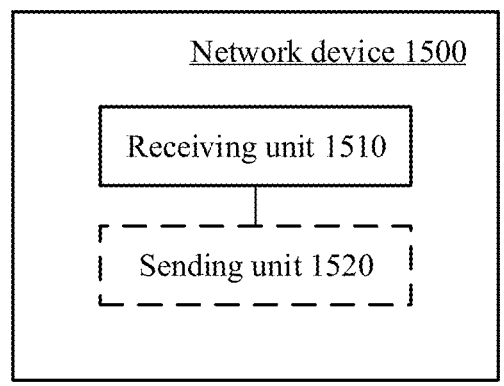
FIG. 15 is a schematic diagram of a network device provided in some embodiments of the present disclosure.
Figure 16:
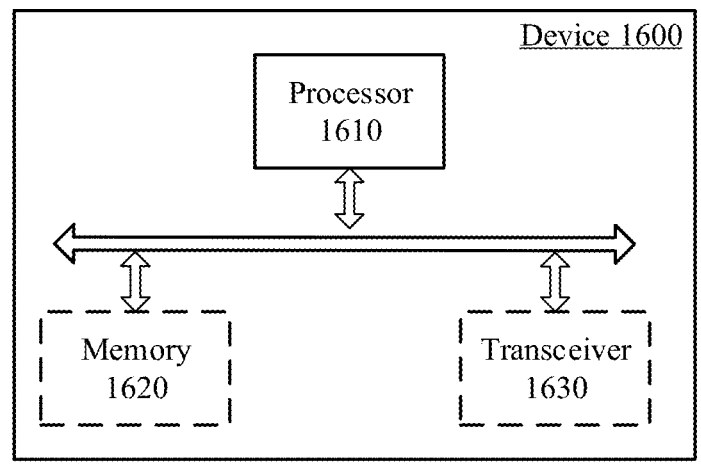
FIG. 16 is a schematic structural diagram of a communication device provided in some embodiments of the present disclosure.

With reference to FIG. 4 to FIG. 13, the embodiments for the method of the present disclosure are described in detail above. With reference to FIG. 14 to FIG. 16, the embodiments for the device of the present disclosure will be described in detail below. It should be understood that the description of the embodiments for the device and the description of the embodiments for the method correspond to each other, so the parts not described in detail can make reference to the previous embodiments for the method.

FIG. 14 is a schematic structural diagram of a terminal device according to an embodiment of the present disclosure. As shown in FIG. 14, the terminal device 1400 includes an acquisition unit 1410 and a sending unit 1420.

The acquisition unit 1410 is configured to acquire first information.

The sending unit 1420 is configured to send a first BSR to a network device based on the first information. The first BSR is configured to indicate data volume of data to be transmitted and a remaining transmission duration corresponding to the data to be transmitted.

Optionally, the first information is configured to indicate at least one of: information related to a first BSR table, data suitable to be included in a statistical range of the first BSR, a triggering condition of the first BSR, a generation method of the first BSR, or a transmission resource used by the first BSR. The first BSR table includes a corresponding relationship between BSR code points and the data volume.

Optionally, the information related to the first BSR table includes at least one of a parameter in the first BSR table or valid time of the first BSR table.

Optionally, the parameter in the first BSR table includes at least one of: an upper limit of the data volume, a lower limit of the data volume, a number of bits corresponding to the BSR code points, or step sizes of the BSR code points.

Optionally, start valid time of the first BSR table is configuration time of the first BSR table, or start valid time of the first BSR table is first time indicated by the network device.

Optionally, the first BSR table includes a plurality of BSR tables, and the terminal device further includes: a receiving unit 1430, configured to receive second information sent by the network device. The second information is configured to activate or deactivate at least one BSR table of the plurality of BSR tables.

Optionally, the data suitable to be included in the statistical range of the first BSR is related to a first parameter corresponding to the data to be transmitted, and the first parameter includes at least one of: a logical channel, a logical channel group, a DRB, a PDCP, an RLC, a QoS stream, a PDU set, a remaining transmission duration or a transmission resource.

Optionally, the data suitable to be included in the statistical range of the first BSR satisfies at least one condition of: the first parameter corresponding to the data to be transmitted belongs to preset first parameters, the first parameter corresponding to the data to be transmitted meets a preset threshold requirement, or the data to be transmitted meets a requirement of statistical granularity. The statistical granularity is related to the first parameter.

Optionally, a statistical granularity of the first BSR is a PDU set.

Optionally, the data suitable to be included in the statistical range of the first BSR satisfies at least one condition of: the logical channel corresponding to the data to be transmitted belongs to preset logical channels, the logical channel corresponding to the data to be transmitted meets a preset logical channel threshold requirement, the logical channel group corresponding to the data to be transmitted belongs to preset logical channel groups, the logical channel group corresponding to the data to be transmitted meets a preset logical channel group threshold requirement, the DRB corresponding to the data to be transmitted belongs to preset DRBs, the DRB corresponding to the data to be transmitted meets a preset DRB threshold requirement, the PDCP corresponding to the data to be transmitted belongs to preset PDCPs, the PDCP corresponding to the data to be transmitted meets a preset PDCP threshold requirement, the RLC corresponding to the data to be transmitted belongs to preset RLCs, the RLC corresponding to the data to be transmitted meets a preset RLC threshold requirement, the QoS stream corresponding to the data to be transmitted belongs to preset QoS streams, the PDU set corresponding to the data to be transmitted belongs to preset PDU sets, a PDU set type corresponding to the data to be transmitted belongs to preset PDU set types, the remaining transmission duration corresponding to the data to be transmitted is lower than a first duration threshold, the remaining transmission duration corresponding to the data to be transmitted is higher than a second duration threshold, and the transmission resource corresponding to the data to be transmitted does not belong to dedicated resources.

Optionally, the first BSR table includes a plurality of BSR tables, and a respective corresponding relationship between each BSR table of the plurality of BSR tables and the first parameter is configured by the network device.

Optionally, the triggering condition of the first BSR is related to a second parameter corresponding to the data to be transmitted and the remaining transmission duration. The second parameter includes at least one of: a PDU set, a QoS stream, a DRB, a PDCP, an RLC, a logical channel or a logical channel group.

Optionally, the triggering condition of the first BSR is related to at least one of: data corresponding to the second parameter, a priority of the second parameter corresponding to the data to be transmitted, a priority of a second parameter type corresponding to the data to be transmitted, or mapping relationships among a plurality of second parameters.

Optionally, the triggering condition of the first BSR includes at least one of: the data corresponding to the second parameter is updated, the priority of the second parameter corresponding to the data to be transmitted meets a preset priority threshold requirement, the priority of the second parameter corresponding to the data to be transmitted is within a preset priority range, the priority of the second parameter type corresponding to the data to be transmitted meets the preset priority threshold requirement, the priority of the second parameter type corresponding to the data to be transmitted is within the preset priority range, the mapping relationships among the plurality of the second parameters are updated, the second parameter corresponding to the data to be transmitted belongs to preset second parameters, or the second parameter type corresponding to the data to be transmitted belongs to preset second parameter types.

Optionally, the triggering condition of the first BSR includes at least one of: a priority of the second parameter corresponding to updated data is higher than a first priority threshold, the priority of the second parameter corresponding to the updated data is within a first priority range, the priority of the second parameter corresponding to the updated data is higher than a priority of the second parameter corresponding to the data to be transmitted in the terminal device, the second parameter corresponding to the updated data belongs to preset second parameters, a priority of a second parameter type corresponding to the updated data is higher than a second priority threshold, the priority of the second parameter type corresponding to the updated data is within a second priority range, the priority of the second parameter type corresponding to the updated data is higher than a priority of a second parameter type corresponding to the data to be transmitted in the terminal device, the second parameter type corresponding to the updated data belongs to preset second parameter types, the remaining transmission duration of the data to be transmitted corresponding to the second parameter is less than a third duration threshold, or added new data is not deleted.

Optionally, updating data includes at least one of adding new data or deleting data.

Optionally, the first BSR is generated based on corresponding relationships between intervals of remaining transmission durations and a third parameter. The third parameter includes one of: a PDU set, a QoS stream, a DRB, a PDCP, an RLC, a logical channel or a logical channel group.

Optionally, the data to be transmitted indicated by the first BSR includes a plurality of levels of data to be transmitted. The plurality of levels are determined based on the intervals of the remaining transmission durations and the third parameter.

Optionally, a priority of the first BSR is higher than a priority of a data channel, and/or the priority of the first BSR is lower than a priority of a control channel.

Optionally, the first BSR satisfies at least one of: having a dedicated logical channel identification, multiplexing one TB with a logical channel corresponding to a specific service, or having a dedicated transmission resource.

Optionally, in response to the first BSR being borne on a dedicated transmission resource, a MAC sub-header corresponding to the first BSR does not bear a logical channel identification corresponding to the first BSR.

Optionally, in response to the first BSR having a determined length, a length field is not included in a MAC sub-header corresponding to the first BSR.

Optionally, the first information is configured to indicate a resource not available for transmitting the first BSR.

Optionally, the sending unit is further configured to: send a second BSR to the network device. The second BSR is configured to indicate the data volume of the data to be transmitted. The first BSR is determined based on a first BSR table, the second BSR is determined based on a second BSR table, and the first BSR table has corresponding relationships among BSR code points and the data volume different from corresponding relationships among BSR code points and the data volume in the second BSR table.

Optionally, the terminal device further includes: a processing unit, configured to, in response to a data packet to be transmitted corresponding to the second BSR including the data to be transmitted corresponding to the first BSR, and to the second BSR being sent, cancel triggering of the first BSR.

Optionally, the first information is sent by the network device to the terminal device.

Optionally, the data to be transmitted is augmented reality XR data.

FIG. 15 is a schematic diagram of a network device according to an embodiment of the present disclosure. The network device 1500 shown in FIG. 15 includes a receiving unit 1510.

Optionally, the receiving unit 1510 is configured to receive a first BSR sent by a terminal device. The first BSR is generated based on first information, and the first BSR is configured to indicate data volume of data to be transmitted and a remaining transmission duration corresponding to the data to be transmitted.

Optionally, the first information is configured to indicate at least one of: information related to a first BSR table, data suitable to be included in a statistical range of the first BSR, a triggering condition of the first BSR, a generation method of the first BSR, or a transmission resource used by the first BSR. The first BSR table includes a corresponding relationship between BSR code points and the data volume.

Optionally, the information related to the first BSR table includes at least one of a parameter in the first BSR table or valid time of the first BSR table.

Optionally, the parameter in the first BSR table includes at least one of: an upper limit of the data volume, a lower limit of the data volume, a number of bits corresponding to the BSR code points, or step sizes of the BSR code points.

Optionally, start valid time of the first BSR table is configuration time of the first BSR table, or start valid time of the first BSR table is first time indicated by the network device.

Optionally, the first BSR table includes a plurality of BSR tables, and the network device further includes: a sending unit, configured to send second information to the terminal device. The second information is configured to activate or deactivate at least one BSR table of the plurality of BSR tables.

Optionally, the data suitable to be included in the statistical range of the first BSR is related to a first parameter corresponding to the data to be transmitted, and the first parameter includes at least one of: a logical channel, a logical channel group, a DRB, a PDCP, an RLC, a QoS stream, a PDU set, a remaining transmission duration or a transmission resource.

Optionally, the data suitable to be included in the statistical range of the first BSR satisfies at least one condition of: the first parameter corresponding to the data to be transmitted belongs to preset first parameters, the first parameter corresponding to the data to be transmitted meets a preset threshold requirement, or the data to be transmitted meets a requirement of statistical granularity. The statistical granularity is related to the first parameter.

Optionally, a statistical granularity of the first BSR is a PDU set.

Optionally, the data suitable to be included in the statistical range of the first BSR satisfies at least one condition of: the logical channel corresponding to the data to be transmitted belongs to preset logical channels, the logical channel corresponding to the data to be transmitted meets a preset logical channel threshold requirement, the logical channel group corresponding to the data to be transmitted belongs to preset logical channel groups, the logical channel group corresponding to the data to be transmitted meets a preset logical channel group threshold requirement, the DRB corresponding to the data to be transmitted belongs to preset DRBs, the DRB corresponding to the data to be transmitted meets a preset DRB threshold requirement, the PDCP corresponding to the data to be transmitted belongs to preset PDCPs, the PDCP corresponding to the data to be transmitted meets a preset PDCP threshold requirement, the RLC corresponding to the data to be transmitted belongs to preset RLCs, the RLC corresponding to the data to be transmitted meets a preset RLC threshold requirement, the QoS stream corresponding to the data to be transmitted belongs to preset QoS streams, the PDU set corresponding to the data to be transmitted belongs to preset PDU sets, a PDU set type corresponding to the data to be transmitted belongs to preset PDU set types, the remaining transmission duration corresponding to the data to be transmitted is lower than a first duration threshold, the remaining transmission duration corresponding to the data to be transmitted is higher than a second duration threshold, and the transmission resource corresponding to the data to be transmitted does not belong to dedicated resources.

Optionally, the first BSR table includes a plurality of BSR tables, and a respective corresponding relationship between each BSR table of the plurality of BSR tables and the first parameter is configured by the network device.

Optionally, the triggering condition of the first BSR is related to a second parameter corresponding to the data to be transmitted and the remaining transmission duration. The second parameter includes at least one of: a PDU set, a QoS stream, a DRB, a PDCP, an RLC, a logical channel or a logical channel group.

Optionally, the triggering condition of the first BSR is related to at least one of: data corresponding to the second parameter, a priority of the second parameter corresponding to the data to be transmitted, a priority of a second parameter type corresponding to the data to be transmitted, or mapping relationships among a plurality of second parameters.

Optionally, the triggering condition of the first BSR includes at least one of: the data corresponding to the second parameter is updated, the priority of the second parameter corresponding to the data to be transmitted meets a preset priority threshold requirement, the priority of the second parameter corresponding to the data to be transmitted is within a preset priority range, the priority of the second parameter type corresponding to the data to be transmitted meets the preset priority threshold requirement, the priority of the second parameter type corresponding to the data to be transmitted is within the preset priority range, the mapping relationships among the plurality of the second parameters are updated, the second parameter corresponding to the data to be transmitted belongs to preset second parameters, or the second parameter type corresponding to the data to be transmitted belongs to preset second parameter types.

Optionally, the triggering condition of the first BSR includes at least one of: a priority of the second parameter corresponding to updated data is higher than a first priority threshold, the priority of the second parameter corresponding to the updated data is within a first priority range, the priority of the second parameter corresponding to the updated data is higher than a priority of the second parameter corresponding to the data to be transmitted in the terminal device, the second parameter corresponding to the updated data belongs to preset second parameters, a priority of a second parameter type corresponding to the updated data is higher than a second priority threshold, the priority of the second parameter type corresponding to the updated data is within a second priority range, the priority of the second parameter type corresponding to the updated data is higher than a priority of a second parameter type corresponding to the data to be transmitted in the terminal device, the second parameter type corresponding to the updated data belongs to preset second parameter types, the remaining transmission duration of the data to be transmitted corresponding to the second parameter is less than a third duration threshold, or added new data is not deleted.

Optionally, updating data includes at least one of adding new data or deleting data.

Optionally, the first BSR is generated based on corresponding relationships between intervals of remaining transmission durations and a third parameter. The third parameter includes one of: a PDU set, a QoS stream, a DRB, a PDCP, an RLC, a logical channel or a logical channel group.

Optionally, the data to be transmitted indicated by the first BSR includes a plurality of levels of data to be transmitted, wherein the plurality of levels are determined based on the intervals of the remaining transmission durations and the third parameter.

Optionally, a priority of the first BSR is higher than a priority of a data channel, and/or the priority of the first BSR is lower than a priority of a control channel.

Optionally, the first BSR satisfies at least one of: having a dedicated logical channel identification, multiplexing one TB with a logical channel corresponding to a specific service, or having a dedicated transmission resource.

Optionally, in response to the first BSR being borne on a dedicated transmission resource, a MAC sub-header corresponding to the first BSR does not bear a logical channel identification corresponding to the first BSR.

Optionally, in response to the first BSR having a determined length, a length field is not included in a MAC sub-header corresponding to the first BSR.

Optionally, the first information is configured to indicate a resource not available for transmitting the first BSR.

Optionally, the receiving unit is further configured to: receive a second BSR sent by the terminal device. The second BSR is configured to indicate the data volume of the data to be transmitted. The first BSR is determined based on a first BSR table, the second BSR is determined based on a second BSR table, and the first BSR table has corresponding relationships among BSR code points and the data volume different from corresponding relationships among BSR code points and the data volume in the second BSR table.

Optionally, the first information is sent by the network device to the terminal device.

Optionally, the data to be transmitted is augmented reality XR data.

FIG. 16 is a schematic structural diagram of a communication device according to an embodiment of the present disclosure. The dotted line in FIG. 16 indicates that the unit or the module is optional. The device 1600 in FIG. 16 is configured to implement the method described in the above embodiments for the method. The device 1600 may be a chip, a terminal device or a network device.

The device 1600 may include at least one processor 1610. The at least one processor 1610 can support the device 1600 to implement the method described in the above embodiments for the method. The at least one processor 1610 may be a general-purpose processor or a special-purpose processor. For example, the processor is a central processing unit (CPU). Alternatively, the processor may be other general-purpose processor, a digital signal processor (DSP), an application specific integrated circuits (ASIC), a field programmable gate array (FPGA) or other programmable logic device, a discrete gate or a transistor logic device, a discrete hardware component, etc. The general-purpose processor may be a microprocessor or the processor may be any conventional processor, etc.

The device 1600 further includes at least one memory 1620 storing a program. The program is executed by the processor 1610 to perform the method described in the above embodiments for the method. The memory 1620 is independent of or integrated in the processor 1610.

The device 1600 further includes a transceiver 1630. The processor 1610 communicates with other devices or chips via the transceiver 1630. For example, the processor 1610 sends and receives data with other devices or chips via the transceiver 1630.

A computer-readable storage medium configured to store a program is provided by an embodiment of the present disclosure. The computer-readable storage medium is applicable to the terminal device or the network device provided by the embodiments of the present disclosure, and the program causes the computer to perform the method executed by the terminal device or the network device according to the embodiments of the present disclosure.

A computer program product configured to store a program is provided by an embodiment of the present disclosure. The computer program product includes a program. The computer program product is applicable to the terminal device or the network device provided by the embodiments of the present disclosure, and the program causes the computer to perform the method executed by the terminal device or the network device according to the embodiments of the present application.

The terms "system" and "network" in the embodiments of the present disclosure may be used interchangeably. In addition, the terms used in the present disclosure are only used to explain the specific embodiment of the present disclosure, and are not intended to limit the present disclosure. The terms "first", "second", "third", and "fourth" used to are used to distinguish between different objects and are not intended to describe a particular order. In addition, the terms "include" and "have", and any variations thereof, are intended to cover non-exclusive inclusion.

In the embodiments of the present disclosure, the term "indicate" may be a direct indication, an indirect indication, or an association relationship. For example, A indicates to B, which can mean that A indicates to B directly, for example, B can be accessed through A, or it can mean that A indicates to B indirectly, for example, A indicates to C, and that B can be accessed through C, or it can mean that there is an associative relationship between A and B.

In the embodiments of the present disclosure, the term "correspond" can indicate a direct or indirect corresponding relationship between the two, or an associative relationship between the two, or a relationship between indicating and being indicated, or configuring and being configured, and the like.

In the embodiments of the present disclosure, "pre-defined" or "pre-configured" can be realized by pre-saving the corresponding code, table, or other means of indicating relevant information in a device (e.g., including the terminal device and the network device), which is not limited in the embodiments of the present disclosure. For example, "pre-defined" can refer to defined in a protocol.

In the embodiments of the present disclosure, determining B according to A does not mean determining B only according to A, but also according to A and/or other information.

In the embodiments of the present disclosure, the term "and/or" is only an association relationship describing the associated objects, which means that there can be three relationships. For example, A and/or B, which can mean that there are three situations: A, A and B, and B. In addition, the character "/" herein generally indicates an "or" relationship between the associated objects.

In the embodiments of the present disclosure, the magnitude of the reference numerals of the above processes does not imply the order of execution, and the order of execution of the processes should be determined by its function and inherent logic, without any limitation on the process of implementation of the embodiments of the present disclosure.

In the embodiments of the present disclosure, it should be understood that the disclosed system, device and method can be realized in other ways. For example, the embodiments for the device described above are only schematic. For example, the division of the units is only a logical function division. In actual implementation, there may be other division methods, such as a plurality of units or components can be combined or integrated into another system, or some features can be ignored or not implemented. In addition, the coupling or direct coupling or communication connection shown or discussed can be indirect coupling or communication connection through some interfaces, devices or units, which can be electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of the embodiments of the present disclosure.

In addition, each respective functional unit in the embodiments of the present disclosure can be integrated into one processing unit, or each respective unit can exist physically, or two or more units can be integrated into one unit.

The above embodiments can be implemented in whole or in part by software, hardware, firmware or any combination thereof. In case of being implemented in software, the embodiments can be fully or partially implemented in the form of a computer program product. The computer program product includes at least one computer instruction. When the at least one computer program instruction is loaded and executed on a computer, the flow or function described in the embodiments of the present disclosure is generated in whole or in part. The computer can be a general-purpose computer, a special-purpose computer, a computer network, or other programmable devices. The computer instruction can be stored in a computer-readable storage medium or transmitted from one computer-readable storage medium to another computer-readable storage medium. For example, the computer instruction can be transmitted from one website, computer, server or data center to another website, computer, server or data center by a wired way (such as a coaxial cable, an optical fiber, a digital subscriber line (DSL)), or a wireless way (such as infrared, wireless, microwave, etc.). The computer-readable storage medium can be any available medium that a computer can read or a data storage device such as a server, data center, that integrates at least one available medium. The available medium may be a magnetic medium (such as a floppy disk, a hard disk, or a magnetic tape), an optical medium (such as a digital video disc (DVD)) or a semiconductor medium (such as a solid state disk (SSD)).

The above is only the specific embodiments of the present disclosure, but the protection scope of the present disclosure is not limited thereto. Any variations or substitutions that can be easily conceived by those skilled in the art within the technical scope disclosed by the present disclosure, should be included in the protection scope of the present disclosure. Therefore, the protection scope of the present disclosure should be based on the protection scope of the claims.

What is claimed is:

1. A method for transmitting a buffer state report (BSR), comprising:
   acquiring, by a terminal device, first information; and
   sending, by the terminal device, a first BSR to a network device based on the first information, wherein the first BSR indicates data volume of data to be transmitted corresponding to each remaining transmission duration interval of a plurality of remaining transmission duration intervals.

2. The method of claim 1, wherein the first information indicates at least one of: information related to a first BSR table, data suitable to be included in a range of the first BSR, a triggering condition of the first BSR, a generation method of the first BSR, or a transmission resource used by the first BSR.

3. The method of claim 2, wherein the first BSR table includes a plurality of BSR tables, and the method further comprises:
   receiving, by the terminal device, second information sent by the network device, wherein the second information is configured to activate or deactivate at least one BSR table of the plurality of BSR tables.

4. The method of claim 2, wherein the data suitable to be included in the range of the first BSR is related to a first parameter corresponding to the data to be transmitted, and the first parameter includes at least one of: a logical channel, a logical channel group, a data radio bear (DRB), a packet data convergence protocol (PDCP), a radio link control (RLC), a quality of service (QOS) stream, a protocol data unit (PDU) set, a remaining transmission duration, or a transmission resource.

5. The method of claim 4, wherein the data suitable to be included in the range of the first BSR satisfies at least one condition of:
   the first parameter corresponding to the data to be transmitted belongs to preset first parameters;
   the first parameter corresponding to the data to be transmitted meets a preset threshold requirement; or
   the data to be transmitted meets a requirement of statistical granularity, wherein the statistical granularity is related to the first parameter.

6. The method of claim 5, wherein the data suitable to be included in the range of the first BSR satisfies at least one condition of:
   the logical channel corresponding to the data to be transmitted belongs to preset logical channels;
   the logical channel corresponding to the data to be transmitted meets a preset logical channel threshold requirement;
   the logical channel group corresponding to the data to be transmitted belongs to preset logical channel groups;
   the logical channel group corresponding to the data to be transmitted meets a preset logical channel group threshold requirement;
   the DRB corresponding to the data to be transmitted belongs to preset DRBs;
   the DRB corresponding to the data to be transmitted meets a preset DRB threshold requirement;
   the PDCP corresponding to the data to be transmitted belongs to preset PDCPs;
   the PDCP corresponding to the data to be transmitted meets a preset PDCP threshold requirement;
   the RLC corresponding to the data to be transmitted belongs to preset RLCs;
   the RLC corresponding to the data to be transmitted meets a preset RLC threshold requirement;

the QoS stream corresponding to the data to be transmitted belongs to preset QoS streams;
the PDU set corresponding to the data to be transmitted belongs to preset PDU sets;
a PDU set type corresponding to the data to be transmitted belongs to preset PDU set types;
the remaining transmission duration corresponding to the data to be transmitted is lower than a first duration threshold;
the remaining transmission duration corresponding to the data to be transmitted is higher than a second duration threshold; or
the transmission resource corresponding to the data to be transmitted does not belong to dedicated resources.

7. The method of claim 4, wherein the first BSR table includes a plurality of BSR tables, and a respective corresponding relationship between each BSR table of the plurality of BSR tables and the first parameter is configured by the network device.

8. The method of claim 2, wherein the triggering condition of the first BSR is related to a second parameter corresponding to the data to be transmitted and the plurality of remaining transmission duration levels, wherein the second parameter includes at least one of:
a PDU set, a QoS stream, a DRB, a PDCP, an RLC, a logical channel or a logical channel group.

9. The method of claim 8, wherein the triggering condition of the first BSR is related to at least one of:
data corresponding to the second parameter;
a priority of the second parameter corresponding to the data to be transmitted;
a priority of a second parameter type corresponding to the data to be transmitted; or
mapping relationships among a plurality of second parameters.

10. The method of claim 9, wherein the triggering condition of the first BSR includes at least one of:
the data corresponding to the second parameter is updated;
the priority of the second parameter corresponding to the data to be transmitted meets a preset priority threshold requirement;
the priority of the second parameter corresponding to the data to be transmitted is within a preset priority range;
the priority of the second parameter type corresponding to the data to be transmitted meets the preset priority threshold requirement;
the priority of the second parameter type corresponding to the data to be transmitted is within the preset priority range;
the mapping relationships among the plurality of the second parameters are updated;
the second parameter corresponding to the data to be transmitted belongs to preset second parameters; or
the second parameter type corresponding to the data to be transmitted belongs to preset second parameter types.

11. The method of claim 2, wherein the first BSR is generated based on corresponding relationships between the plurality of remaining transmission duration intervals and a third parameter, wherein the third parameter includes one of: a PDU set, a QoS stream, a DRB, a PDCP, an RLC, a logical channel, or a logical channel group.

12. The method of claim 11, wherein the data to be transmitted indicated by the first BSR includes a plurality of levels of data to be transmitted, wherein the plurality of levels are determined based on the plurality of remaining transmission duration intervals and the third parameter.

13. The method of claim 1, wherein a priority of the first BSR is higher than a priority of a data channel; or
the priority of the first BSR is lower than a priority of a control channel.

14. The method of claim 1, wherein the first BSR satisfies at least one of:
having a dedicated logical channel identification;
multiplexing one transport block (TB) with a logical channel corresponding to a specific service; or
having a dedicated transmission resource.

15. The method of claim 1, further comprising:
sending, by the terminal device, a second BSR to the network device, wherein the second BSR is configured to indicate the data volume of the data to be transmitted; and
wherein the first BSR is determined based on a first BSR table, the second BSR is determined based on a second BSR table, and the first BSR table has corresponding relationships between BSR code points and data volume different from corresponding relationships between BSR code points and data volume in the second BSR table.

16. The method of claim 1, wherein the data to be transmitted is augmented reality (XR) data.

17. The method of claim 1, wherein the first information comprises configuration information of a plurality of levels of remaining transmission duration, wherein each level of the plurality of levels of remaining transmission duration corresponds to an remaining transmission duration interval, and wherein the configuration information of the plurality of levels of remaining transmission durations are received via radio resource control (RRC) signaling or medium access control (MAC) control element (CE).

18. A method for transmitting a cache status report BSR, comprising:
sending, by a network device, first information, wherein the first information configures a first BSR; and
receiving, by a network device, the first BSR according to the first information, and the first BSR indicates data volume of data to be transmitted corresponding to each remaining transmission duration interval of a plurality of remaining transmission duration intervals.

19. An apparatus, comprising:
at least one processor; and
one or more non-transitory computer-readable storage media coupled to the at least one processor and storing programming instructions for execution by the at least one processor, wherein the programming instructions, when executed, cause the apparatus to perform operations comprising:
acquiring first information; and
sending a first BSR to a network device based on the first information, wherein the first BSR indicates data volume of data to be transmitted corresponding to each remaining transmission duration interval of a plurality of remaining transmission duration intervals.

20. The apparatus of claim 19, wherein the first information indicates at least one of: information related to a first BSR table, data suitable to be included in a range of the first BSR, a triggering condition of the first BSR, a generation method of the first BSR, or a transmission resource used by the first BSR; and
wherein the first BSR table includes corresponding relationships between BSR code points and the data volume.

* * * * *